US009542512B1

(12) United States Patent
Al-Hawari et al.

(10) Patent No.: US 9,542,512 B1
(45) Date of Patent: Jan. 10, 2017

(54) SYSTEM AND METHOD FOR AUTOMATIC CORRECTION OF FLIGHT TIME SKEW OF TIMING SIGNALS IN SIMULATED SOURCE SYNCHRONOUS INTERFACE OPERATION

(75) Inventors: Feras Al-Hawari, Hudson, NH (US); Terry Jernberg, Sutton, MA (US); Roger Cleghorn, Sudbury, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 296 days.

(21) Appl. No.: 13/351,658

(22) Filed: Jan. 17, 2012

(51) Int. Cl.
*G06F 17/50* (2006.01)

(52) U.S. Cl.
CPC .................. *G06F 17/5022* (2013.01)

(58) Field of Classification Search
CPC   G06F 13/1689; G06F 17/5022; H03L 7/0805; H03L 7/0814; G11C 7/222; G11C 2207/2254; G11C 7/00; G11C 7/1066; G11C 7/1093; G11C 7/22; G11C 8/18; G11C 11/4072; G11C 11/4076; G11C 11/4093; G11C 29/02; G11C 29/022; G11C 29/023
USPC ........................................................ 703/13–22
See application file for complete search history.

(56) References Cited

U.S. PATENT DOCUMENTS

| 7,117,143 | B2 * | 10/2006 | Wang .................. G06F 17/5027 703/13 |
| 7,580,037 | B1 * | 8/2009 | Iotov ............................. 345/440 |
| 8,081,527 | B1 * | 12/2011 | Venkataraman et al. ..... 365/194 |
| 8,566,767 | B1 * | 10/2013 | Kukal ................. G06F 17/5031 703/13 |
| 2003/0051222 | A1 * | 3/2003 | Williams et al. ............... 716/12 |
| 2004/0153985 | A1 * | 8/2004 | Paul et al. ...................... 716/10 |
| 2009/0109770 | A1 * | 4/2009 | Sugishita ....................... 365/193 |
| 2009/0244997 | A1 * | 10/2009 | Searles et al. ................. 365/194 |
| 2010/0157700 | A1 * | 6/2010 | Kong et al. .................... 365/194 |
| 2010/0315891 | A1 * | 12/2010 | Welker .......................... 365/193 |
| 2011/0222358 | A1 * | 9/2011 | Ware ........................ 365/189.15 |

OTHER PUBLICATIONS

Cadence PCB Signal and Power Integrity Datasheet, 2010 [retrived on Jan. 21, 2014] downloaded from the internet http://www.artedas.fr/brochures_pdf/Orcad_SigXplor_En.pdf.*

(Continued)

*Primary Examiner* — Kamini S Shah
*Assistant Examiner* — Scott S Cook
(74) *Attorney, Agent, or Firm* — Rosenberg, Klein & Lee

(57) ABSTRACT

A system and method are provided for maintaining alignment of timing signals of a source synchronous interface between driver and receiver portions of an electronic system in a behavioral model based simulation environment. The system comprises a memory unit, an analysis controller unit coupled to the memory unit, and a timing alignment unit coupled to the analysis controller unit. The timing alignment unit is executable responsive to the analysis controller unit to generate behavioral models for mutually assigned first and second nets which transmit respective timing signals between the driver and receiver portions, and actuates transient simulation on the behavioral models to simulate transmission of the timing signals through the first and second nets. A timing skew between respective transmissions of the timing signals through the first and second nets is measured responsive to the simulated transmission for compensation during a general simulation of the source synchronous interface.

25 Claims, 17 Drawing Sheets

(56) References Cited

OTHER PUBLICATIONS

Cadence PCB Signal and Power Integrity Datasheet, 2011 [retrieved on Jan. 20, 2014] downloaded from the internet http://www.cadence.com/rl/resources/datasheets/pcb_signal_ds.pdf.*

White Paper, Utilizing Leveling Techniques in DDR3 SDRAM Memory Interfaces, 2007 [retrieved on Jan. 20, 2014] downloaded from the internet http://www.altera.com/literature/wp/wp-01034-Utilizing-Leveling-Techniques-in-DDR3-SDRAM.pdf.*

Blake R., Murry, P., Al-Hawari, F., Challenges in Implementing DDR3 Memory Interfaces on PCB Systems, Altera Corporate—Public Presentation, 2008 [retrieved on Jan. 20, 2014] downloaded from the internet http://www.cadence.com/cdnlive/library/bestpapers/2008/EMEA/4.1%20BlakeR%20Altera.pdf.*

DDR Memory Design: Challenges & Solutions, XrossTalk, Oct. 2008 [retrieved on Jan. 20, 2014] downloaded from the internet http://www.siconsultant.com/xrosstalk_issues/xrosstalk_oct08_final.pdf.*

Murray, P., Al-Hawari, F., Challenges in implementing DDR3 memory interface on PCB systems: a methodology for interfacing DDR3 SDRAM DIMM to an FPGA, Feb. 2008, DesignCon2008.*

Telian, D., Understanding and Using S-Parameters for PCB Signal Integrity, Cadence Design Systems Inc. 2004.*

Kim_2006 (Kim, K.K., Clock Grid Simulation Using Transient S-parameter Modeling, IMTC 2006—Instrumentation and Measurement Technology Conference Sorrento, Italy Apr. 24-27, 2006).*

Kim_2006 (Clock Grid Simulation Using Transient S-Parameter Modeling, IMTC 2006—Instrumentation and Measurement Technoogy Conference Sorrento, Italy Apr. 24-27, 2006).*

Behavior_Model_Defined.pdf, I/O Buffer Modeling Class 2 Lectures: Intel slide 4: "all models are behavioral" indexed Jan. 24, 2004, downloaded from download.intel.com/education/.../Class17_18_IBIS_io_buffer_class.ppt.*

Ghenassia_2005.pdf, Ghenassia, F., (ed.) Transaction Level Modeling with SystemC, 23-55. Springer. Printed in the Netherlands, Transaction-Level Modeling with SystemC TLM Concepts and Applications for Embedded Systems Ghenassia (ed.) 2005, XVI, 272 p., Hardcover ISBM: 978-0-387-26232-1.*

Mcnamara, M., Use Transaction-Level Models to ensure Hardware and Software are in Sync, Dec. 9, 2011 downloaded from http://embedded-computing.com/articles/use-models-ensure-hardware-software-in-sync/#.*

Microsemi Application Note AC198, Clock Skew and Short Paths Timing, Jun. 2011 Microsemi Corporation.*

Mustafa, K., Defining Skew, Propagation-Delay, Phase Offset (Phase Error), High Performance Analog/CDC, Application Report SCAA055—Nov. 2001 Texas Instruments downloaded from http://www.ti.com/lit/an/scaa055/scaa055.pdf.*

Vendor List, Signal Integrity Vendor List, IPC—Association Connecting Electronics Industries | 3000 Lakeside Drive, 105 N, Bannockburn, IL 60015 downloaded on May 11, 2015 https://www.ipc.org/ContentPage.aspx?pageid=Signal-Integrity-Vendor-List Indexed by Google in 2001.*

* cited by examiner

FIG. 16

SYSTEM AND METHOD FOR AUTOMATIC CORRECTION OF FLIGHT TIME SKEW OF TIMING SIGNALS IN SIMULATED SOURCE SYNCHRONOUS INTERFACE OPERATION

BACKGROUND OF THE INVENTION

The subject system and method are generally directed to optimizing the electrical integrity analysis of an electronic system to be implemented (be it on a chip, package, or board level). The system and method provide for automated measures to ensure that various electrical integrity analyses in a simulated environment, such as for signal integrity, accurately and efficiently account for flight time skew of timing signals that the electronic system would actually encounter (and suitably account for) when physically implemented. The system and method provide such measures which automatically model the real world operating conditions due to geometry and other factors and more accurately reflect the timing of signals in the physical implementation.

With the ongoing trend of electronic systems implementations growing in sophistication and complexity, it is increasingly important to employ highly accurate and efficient simulation techniques to characterize performance baselines of electronic system designs prior to actual fabrication. Simulation-based analyses, such as Signal Integrity (SI) analyses, are ways to establish the baseline performance of electronic system designs before expending valuable resources in prototyping the same.

These analyses are carried out using suitable simulation and analysis tools. In the case of SI analysis, the analysis is carried out using simplified simulation runs based on behavioral models, rather than on actual transistor or other such hardware models. The benefits of this—in terms of streamlined simulation runs, and the faster analyses and reduced design cycles they permit—are considerable given that a typical electronic circuit board design may contain thousands of nets or more. While simulation runs based on actual transistor models would provide more extensive information about all that is occurring in the modeled hardware, the processing loads and execution times required for the runs would be prohibitive for many applications. Moreover, since SI analysis focuses primarily on signal quality (strengths, speed, fidelity, and the like), the added information would hardly enhance SI analysis enough to justify the additional processing and time costs.

Among the tradeoffs of such streamlined simulation, however, is that certain non-trivial effects are not adequately considered, at least not in sufficiently automated manner. Effects like flight time skew manifest in physical implementations are not intrinsically accounted for in behavioral model based SI topologies employed to represent the given electronic system (or portion thereof). It is normally left to a designer to account for these effects, by either calculating them manually or deriving them through other external means. The timing adjustments which result must then be entered in the simulation and analysis tool if the analytic simulation runs on the SI topologies are to be properly configured.

Such manual calculation means require the user to analyze the nets, then identify and actuate simulation of the required nets (i.e., the clock and its associated strobes) to model read/write leveling. The generated waveforms must then be post processed to calculate the flight time skews and calculate the appropriate timing signal offsets to properly align the associated waveforms during simulation of the read and write cycles. This manual process is not only cumbersome and highly prone to error, it is quite time consuming. The practical effect of this is added complication and delay to the design cycle.

There is therefore a need for a system and method which automatically generates the timing adjustments necessary for accurate simulation of the electronic system portion(s) being analyzed. There is a need for an automated approach whereby such effects as flight time skew in timing signals may be properly accounted for in a behavioral model based simulation environment.

SUMMARY OF THE INVENTION

It is an object of the present invention to provide a system and method for optimizing electrical integrity analyses of a source synchronous interface to account for misalignment of mutually associated timing signals.

It is another object of the present invention to provide a system and method for automatically determining flight time skew affecting a source synchronous interface for use in modeling suitable compensation therefor during electrical integrity analysis of the interface.

These and other objects are attained in a system and method for maintaining alignment of timing signals of a source synchronous interface between driver and receiver portions of an electronic system in a behavioral model based simulation environment. The system comprises a memory unit, an analysis controller unit coupled to the memory unit, and a timing alignment unit coupled to the analysis controller unit. The memory unit stores parametric data relating to the electronic system. The parametric data includes first and second timing signals to be transmitted respectively through predefined first and second nets between the driver and receiver portions, with the first and second nets defining substantially uneven geometric path lengths between the driver and receiver portions and the first and second timing signals corresponding to predetermined information. The analysis controller unit operates to, among other things, mutually assign the first and second nets one to the other. The timing alignment unit is executable responsive to the analysis controller unit to generate first and second behavioral models for the mutually assigned first and second nets, as well as to actuate transient simulation on the first and second behavioral models to simulate transmission of the first and second timing signals through the first and second nets. The timing alignment unit also executes to measure responsive to the simulated transmission a timing skew between respective transmissions of the first and second timing signals through the first and second nets for compensation during a general simulation of the source synchronous interface.

A method realized in accordance with the present invention comprises establishing first and second timing signals corresponding to predetermined information to be transmitted respectively through predefined first and second nets between the driver and receiver portions, where the first and second nets define substantially uneven geometric path lengths between the driver and receiver portions. The first and second nets are mutually assigned one with the other; and, first and second behavioral models are generated for the mutually assigned first and second nets. Transient simulation is executed on the first and second behavioral models in a processor to simulate transmissions of the first and second timing signals through the first and second nets. Responsive to the simulated transmissions, a timing skew between respective transmissions of the first and second timing signals through the first and second nets is measured for compensation during a general simulation of the source synchronous interface.

BRIEF DESCRIPTION OF THE DRAWINGS

FIG. 16 is an illustrative representation of a graphic user interface generated during system operation in an exemplary embodiment of the present invention, showing the display of bus stimulus setup dialog window example.

DESCRIPTION OF THE PREFERRED EMBODIMENTS

Figure 1:
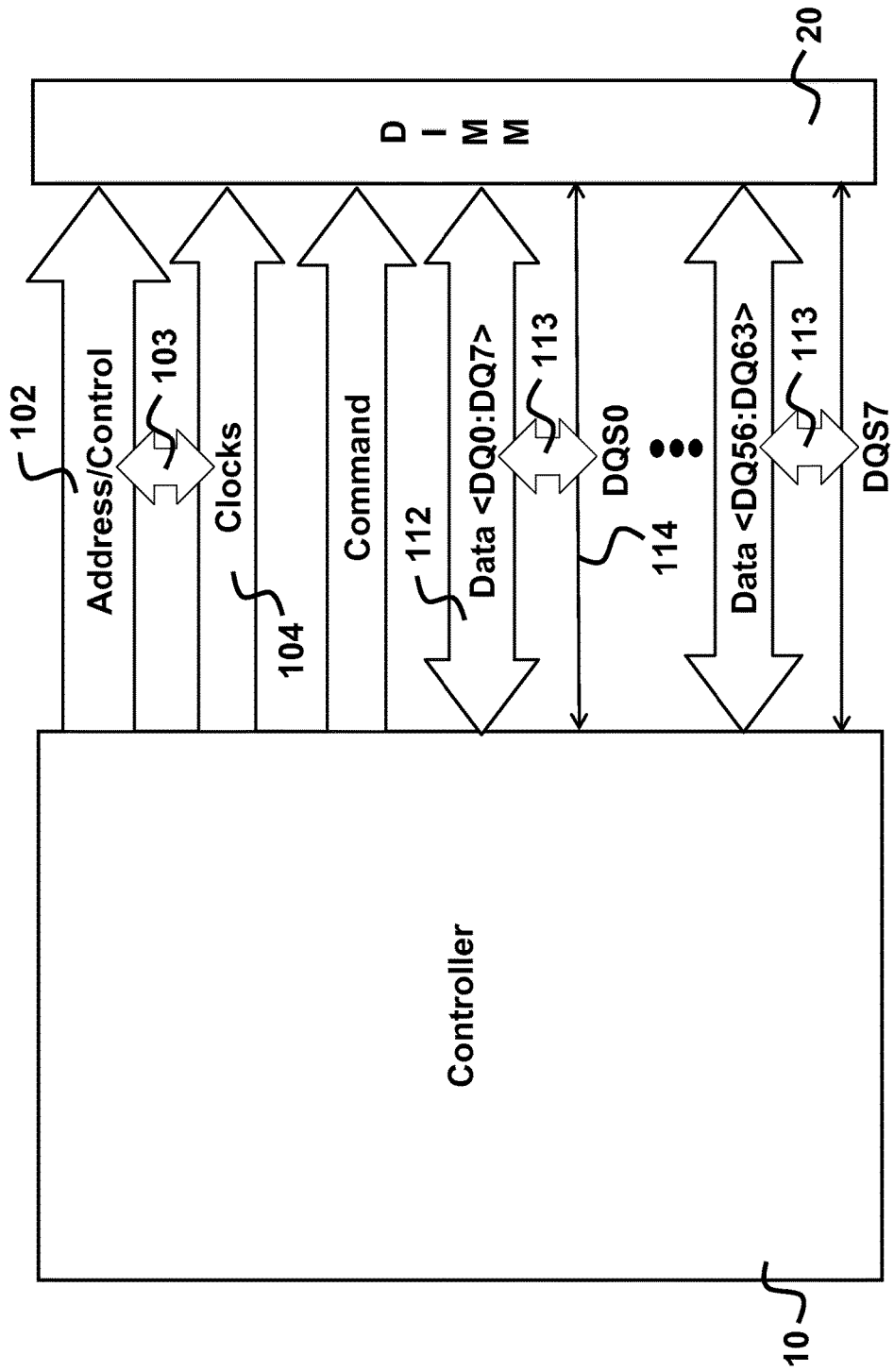
FIG. 1 is a schematic diagram illustrating the passage of signals between a system controller and memory module intercoupled by a source synchronous interface.

Signals within a system may generally be modeled as a voltage waveform transmitted from some driver portion of an electronic system to some receiver portion. In a digital application, the signal is normally defined by a stream of binary voltage values passed between the driver and receiver portions, which may be represented in simulated environments by a corresponding behavioral models (such as IO buffer models). Signal integrity (SI) analysis is carried out to verify the fidelity of such signals passing from a driver IO buffer to a receiver IO buffer through one or more physical interconnects like traces, connectors, vias, etc.—collectively referred to herein as 'nets.' SI analysis thereby characterizes the quality of transmitted signals through the given nets.

In source synchronous interface applications, a data signal is necessarily transmitted with a corresponding strobe signal, while an address signal is necessarily transmitted with a corresponding clock signal. The different routing schemes typically employed for the nets carrying strobe and clock signals cause them to arrive at the same physical destination at different times. That is, the strobe and clock signal 'flight times' are skewed. This may disrupt the reading and writing of data. Accurate reading and writing therefore requires the proper relative alignment, or leveling, of the associated strobe and clock signals.

In broad concept, the subject system and method provide for automatically determining the offsets or other compensation necessary to preserve timing alignment in a source synchronous interface of a given electronic system design, and to do so within a relatively high level simulation environment. As mentioned, in a source synchronous interface, the timing signals needed for properly reading and writing data transmitted between certain sources and destinations within the electronic system design are sent along with the data. This avoids the excessive complexity in clock topology otherwise required if the read/write synchronization merely relied upon a central clock. Such is particularly important in meeting the timing requirements in very high speed applications.

A notable consideration in source synchronous interface applications is ensuring that mutually associated timing signals passed between the same source and destination actually arrive at the destination in properly time aligned manner (for example, substantially at the same time, or at some other substantially preserved relative timing). The actual transistor-level designs of electronic systems employing such source synchronous interfaces make provision for the significantly different path lengths that may be encountered by different timing signals as they travel between the same source and destination. Suitable provisions are normally not made at the higher levels of abstraction for the design. Yet, important electrical integrity analyses are carried out at these higher levels of abstraction; and, even the most comprehensive simulation based design and analysis tools which perform the analyses lack adequate provision to automatically determine, let alone compensate for, the effects of flight time skew and the like introduced between mutually associated timing signals. Electrical integrity analysis tools heretofore known are therefore without adequate measures for accurately modeling the timing of signals in the electronic system's physical implementation subject to these effects.

A system and method realized in accordance with the present invention thus provide for ascertaining the mutually associated timing signals, automatically modeling the respective nets through which they pass from a driver portion of the given electronic circuit design to a receiver portion, and simulating the modeled nets to determine the timing skew that would disrupt proper alignment between the timing signals. The measured timing skew may then be accounted for in further simulation-driven analyses involving the source synchronous interface.

Various forms of source synchronous interfaces are known in the art, and the present invention is not necessarily limited to any particular form. By way of example, one widely used source synchronous interface is the so-called dual (or double) data rate (DDR) memory interface governing communications between a system controller 10 and a memory module 20 (which may be employed in the electronic system to be analyzed), such as illustrated in FIG. 1. An address or other control signal 102 (collectively referred to herein as 'address' signal) in this interface is transmitted along with its corresponding clock signal 104, while each data signal 112 associated with the address signal 102 is transmitted along with its corresponding strobe signal 114 in order to meet timing requirements with minimal skew. The correspondence of signals is schematically indicated for explanatory purposes by the arrows 103, 113.

As illustrated in FIG. 1, a set of data signals may be served by one strobe signal. The individual data signals DQ0 to DQ7 in the illustrated embodiment all correspond to strobe signal DQS0, much as the individual data signals DQ56 to DQ63 all correspond to strobe signal DQS7. A given data bus is typically divided in such embodiment into a number of byte lanes, each lane having a plurality of nets to respectively carry the given set of data signals <DQ0:DQ7>, <DQ56:DQ63> (in this case, eight nets for each lane) corresponding to the shared strobe signal DQS0, DQS7 for that lane.

Figure 2:
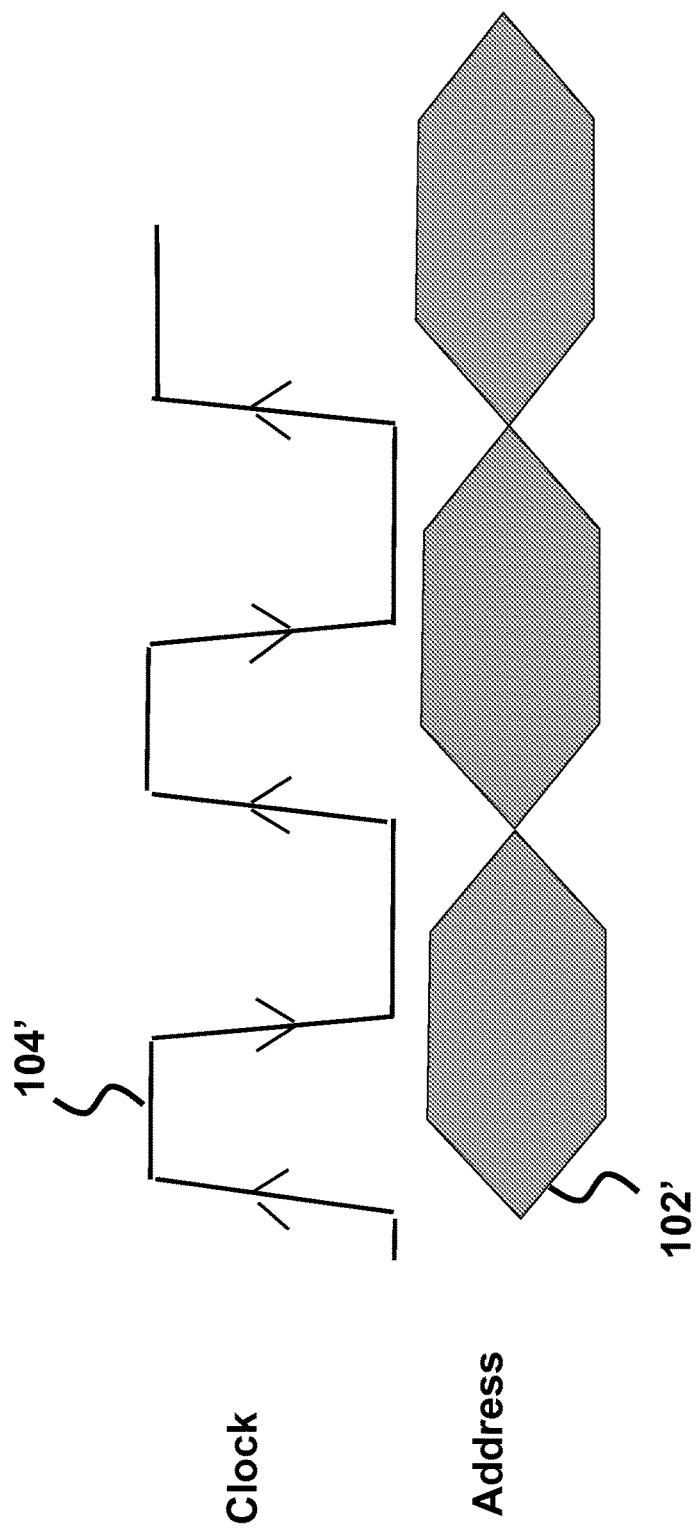
FIG. 2 is the schematic diagram graphically illustrating the association of a clock signal and an address signal in a source synchronous interface.
Figure 3:
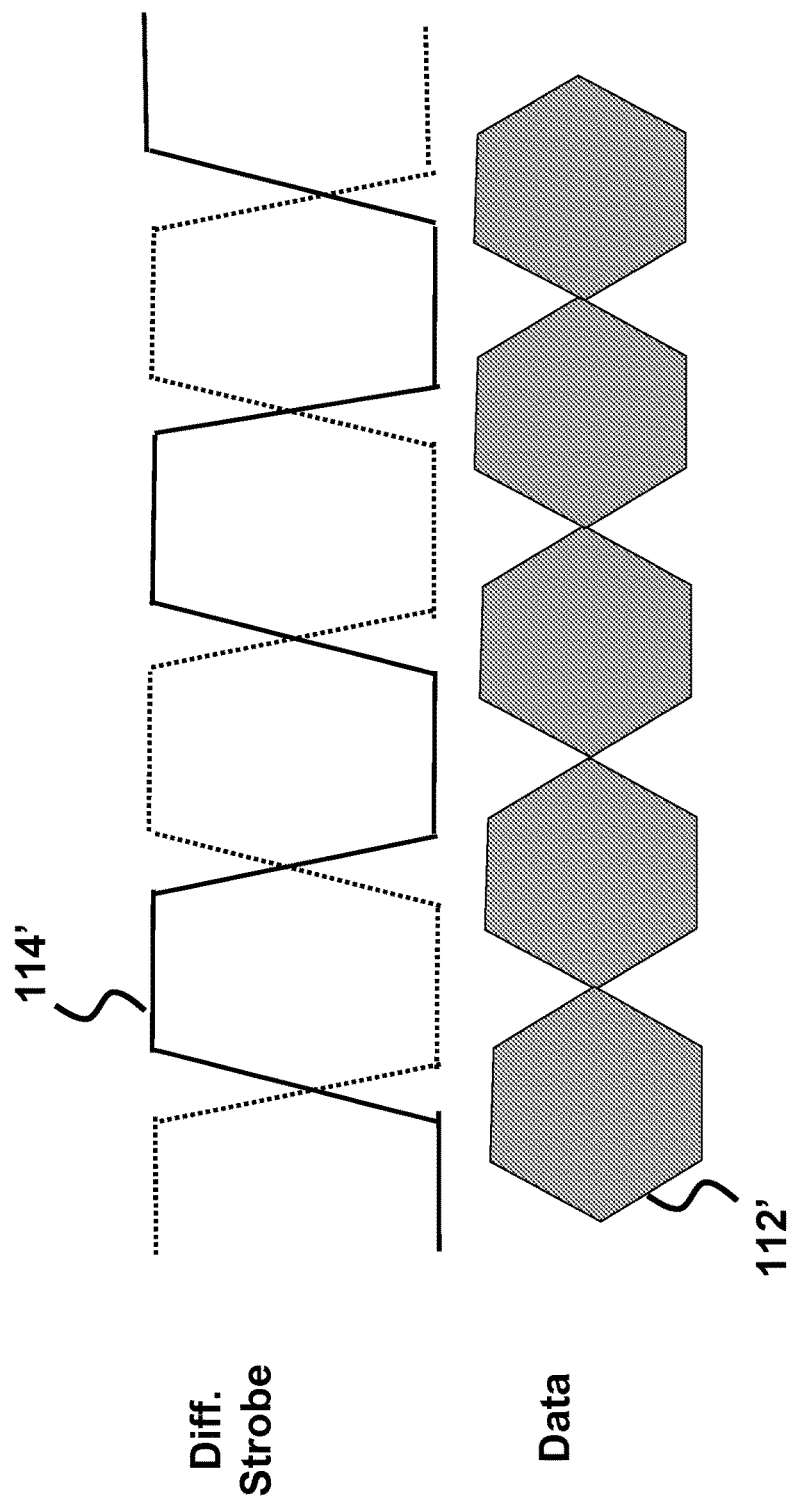
FIG. 3 is the schematic diagram graphically illustrating the association of a strobe signal and a data signal in a source synchronous interface.

As illustrated in FIGS. 2-3, the address signal 102' is latched on a transitional edge (on the rising edge in FIG. 2) of the single ended clock signal 104' (typically carried over a unidirectional bus). On the other hand, the data signal 112' is latched on both transitional edges of the strobe signal 114' (typically carried over a bidirectional bus), such that two data bits are written/read per strobe cycle, making the data rate double the strobe rate. The strobe signal 114' is actually illustrated in this embodiment to be a differential signal, with the data signal being latched at each crossing of the strobe's complementary signal components.

Figure 4:
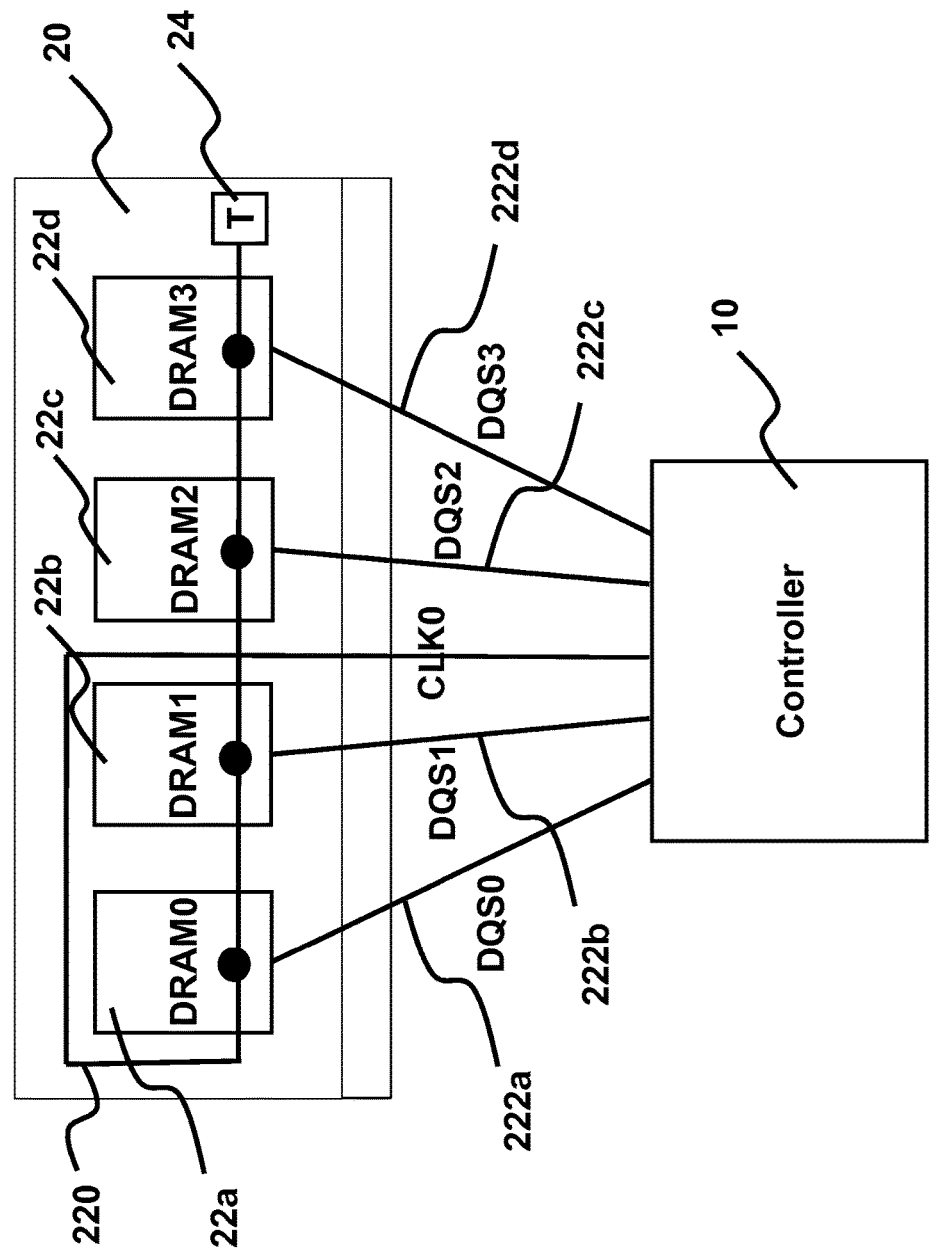
FIG. 4 is a schematic diagram illustrating a double data rate, version 3 (DDR3) memory interface architecture.

Different versions of DDR architecture have been implemented in the memory art. For instance, DDR3, or version 3, is a known DDR architecture which incorporates features offering certain efficiencies over others. FIG. 4 illustrates a simplified example of DDR3 architecture, where a system controller 10 is suitably interconnected by buses and nets to a memory module 20 implemented in the form of a dual inline memory module (DIMM) having a plurality of dynamic random access memory (DRAM) devices 22a, 22b, 22c, 22d. Only the interconnecting nets for clock and strobe signals are shown for simplicity of illustration.

Some of the interconnecting buses/nets are unidirectional, whereby signals may flow in only one direction. In the case of a bus carrying address signals, for example, the signals may only flow from the system controller 10 towards the memory module 20, but not in the reverse direction. Other interconnecting buses/nets are bidirectional, whereby signals may flow in both directions between the interconnected portions. This is so, for example, in the case of a bus carrying data signals, through which the system controller 10 to read data from, or write data to, the various DRAM devices of the memory module 20.

Strobe and data nets in this architecture are directly connected from the controller 10 to the corresponding DRAM devices 22a-22d on the DDR3 DIMM(s) 20. For example, the strobe nets 222a, 222b, 222c, 222d which carry the strobe signals DQS0, DQS1, DQS2, DQS3 are each directly routed to their corresponding devices DRAM0, DRAM1, DRAM2, DRAM3. These strobe nets 222a-222d tend to be substantially similar in routing configuration and length. As such, any differences in the path lengths they define tend to be negligible, at least for electrical integrity analysis purposes.

This is not so for the clock, control, and address nets. Like the net 220 shown (for a clock signal CLK0), the nets for these signals are normally routed on a DDR3 DIMM 20 with a fly-by (daisy-chain) topology. The net 220 in such topology is routed first to one of the DRAM devices 22a, then consecutively past each successive DRAM device 22b-22c, to proceed thereafter to a termination 24. A notable advantage of this fly-by topology is the considerable savings in the number and length of required stubs. Also, the termination it affords on the DIMM 20 itself, rather than on board (on a motherboard, for example) with the system controller 10, frees up board real estate for other uses while providing less ringing and therefore improved signal quality.

Still, the fly-by topology is not without its disadvantages. The corresponding strobe and data signals synchronously sent between the system controller and the different DRAM devices 22a-22d of the memory module 20 reach their destinations at the same desired time. The daisy chained nets for the corresponding clock and control/address signals mean, however, that these signals sent between the system controller and memory module 20 reach their destinations at different times relative to one another. At each of the DRAM devices 22a-22d and by differing degrees, then, these clock and control/address signals are delayed, and by differing degrees, compared to their associated strobe and data signals. The clock and control/address signals necessarily arrive at different times relative to the strobe and data signals. This yields flight time skew between clock and strobe signals during both write and read operations.

Yet, proper write or read operation requires the clock and strobe signals to be properly time aligned. In the case of a write operation, the arrival of associated clock and strobe signals at a particular DRAM device 22a-22d must substantially coincide. In the case of a read operation, the arrival at the system controller 10 of all strobe signals sent from the DRAM devices 22a-22d must substantially coincide. This means that suitable synchronization measures must be carried out (in the system controller, for example) to effect the required write leveling and/or read leveling.

For write leveling, the launch of different strobe signals DQS0, DQS1, DQS2, DQS3 is made at different times to coincide with the clock signal CLK0 arriving sequentially at the DRAM0, DRAM1, DRAM2, DRAM3 devices 22a-22d on the DIMM 20. Each of the strobe signals DQS0, DQS1, DQS2, DQS3 are thus made to arrive at its DRAM device 22a-22d substantially at the same time as the clock signal CLK0.

Conversely, for read leveling, the relative delays in sequentially addressing the different DRAM devices 22a-22d to prompt their responsive transmission of strobe and data signals are 'leveled' by correspondingly delaying the responsive transmissions of the earlier addressed DRAM devices 22a-22d by appropriate intervals. All the different strobe signals DQS0, DQS1, DQS2, DQS3 are thus made to arrive at the system controller 10 substantially at the same time.

A write leveling example is graphically illustrated in FIGS. 5A-5C, with reference to the illustrative DDR3 architecture shown in FIG. 4. FIGS. 5A and 5B illustrate the elapsed times for passage of the respective clock and strobe signals between a driver (system controller 10 in this instance) and receiver (each of the DRAM devices 22a-22d in this instance) during a write cycle, without any leveling. With the fly-by routing on the DIMM 20, the clock signal CLK0 originated by the driver would travel through the intervening clock net 220 first to the DRAM0 device 22a, next to the DRAM1 device 22b, then to the DRAM2 device 22c, and on to the DRAM3 device 22d. As graphically illustrated in FIG. 5A, CLK0 would thus progress in time through the DIMM 20 as follows:

CLK0 would reach DRAM0 at time t0+t1;
CLK0 would reach DRAM1 at time t0+t1+t2;
CLK0 would reach DRAM2 at time t0+t1+t2+t3; and,
CLK0 would reach DRAM3 at time t0+t1+t2+t3+t4.

As for the strobe signals DQS0, DQS1, DQS2, DQS3 originated by the driver, they would travel through intervening strobe nets 222a-222d to all reach the different receivers in parallel at about the same time t0, as shown in FIG. 5B. Without leveling, each would obviously arrive at the different DRAM0, DRAM1, DRAM2, DRAM3 devices 22a-22d variously skewed in time from the associated clock signal.

FIG. 5C illustrates the results of write leveling, whereby the strobe signals DQS0, DQS1, DQS2, DQS3 are substantially aligned with the clock signal CLK0. Each strobe signal's launch from the driver, or system controller 10, is selectively delayed so that it arrives at its receiver, or DRAM device 22a-22d in this instance, when the clock signal CLK0 arrives there. As FIG. 5C illustrates, the time profile of the controlled delay in launching strobe signals would be as follows:

DQS0 launched after time t1 elapses;
DQS1 launched after time t1+t2 elapses;
DQS2 launched after time t1+t2+t3 elapses; and,
DQS3 launched after time t1+t2+t3+t4 elapses.

A read leveling example is illustrated in FIGS. 6A-6B, also with reference to the illustrative DDR3 architecture shown in FIG. 4. FIG. 6A illustrates the elapsed times for the strobe signals DQS0, DQS1, DQS2, DQS3 to pass between a driver (each of the DRAM devices 22a-22d in this instance) and receiver (system controller 10 in this instance) during a read cycle, with no leveling applied. The different strobe signals would reach the system controller 10 successively at different times, since the fly-by routing on the DIMM 20 would cause the clock signal CLK0 sent with the address signal by the controller 10 to reach the DRAM devices 22a-22d at different times. The responsive transmissions of strobe and data signals by the DRAM devices 22a-22d would be successively delayed. As a result, their strobe signals would arrive at the system controller 10 as follows:

DQS0 would reach the controller at time t0+t1;
DQS1 would reach the controller at time t0+t1+t2;
DQS2 would reach the controller at time t0+t1+t2+t3; and,
DQS3 would reach the controller at time t0+t1+t2+t3+t4.

FIG. 6B illustrates the results of read leveling, whereby these strobe signals DQS0, DQS1, DQS2, DQS3 are made to arrive at the system controller 10 at substantially the same time for proper operation of the read cycle. The system controller 10 selectively delays the strobe signals from the different drivers (DRAM devices 22a-22d) as necessary, such that they all arrive at the system controller 10 (receiver) at substantially the same time. As FIG. 6B illustrates, the time profile of the controlled delay of the different strobe signals would occur as follows:

Delay DQS0 by time t2+t3+t4;
Delay DQS1 by time t3+t4; and,
Delay DQS2 by time t4.

Figure 5:
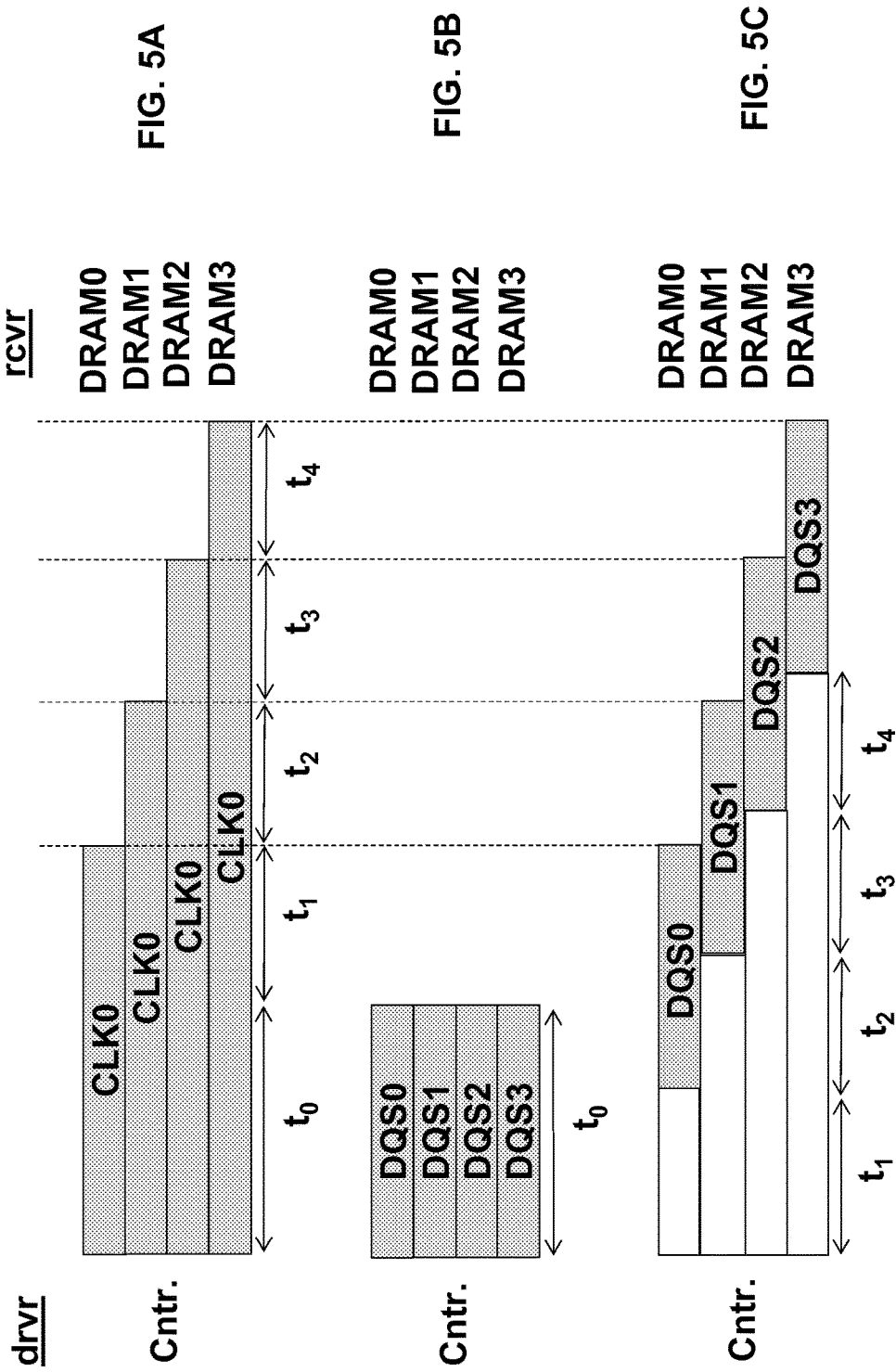
FIG. 5A is a schematic diagram graphically illustrating the juxtaposition of clock signals passed between a system controller and memory devices of a memory module during a write cycle in the interface of FIG. 4, the clock signals without write leveling arriving at different times due to fly-by routing topology.
FIG. 5B is a schematic diagram graphically illustrating the juxtaposition of strobe signals passed between the system controller and memory devices of a memory module during a write cycle in the interface of FIG. 4, the strobe signals arriving concurrently at the memory devices.
FIG. 5C is a schematic diagram graphically illustrating the juxtaposition of strobe signals passed between the system controller and memory devices of a memory module during a write cycle as shown in FIG. 5B, but with write leveling applied.
Figure 6:
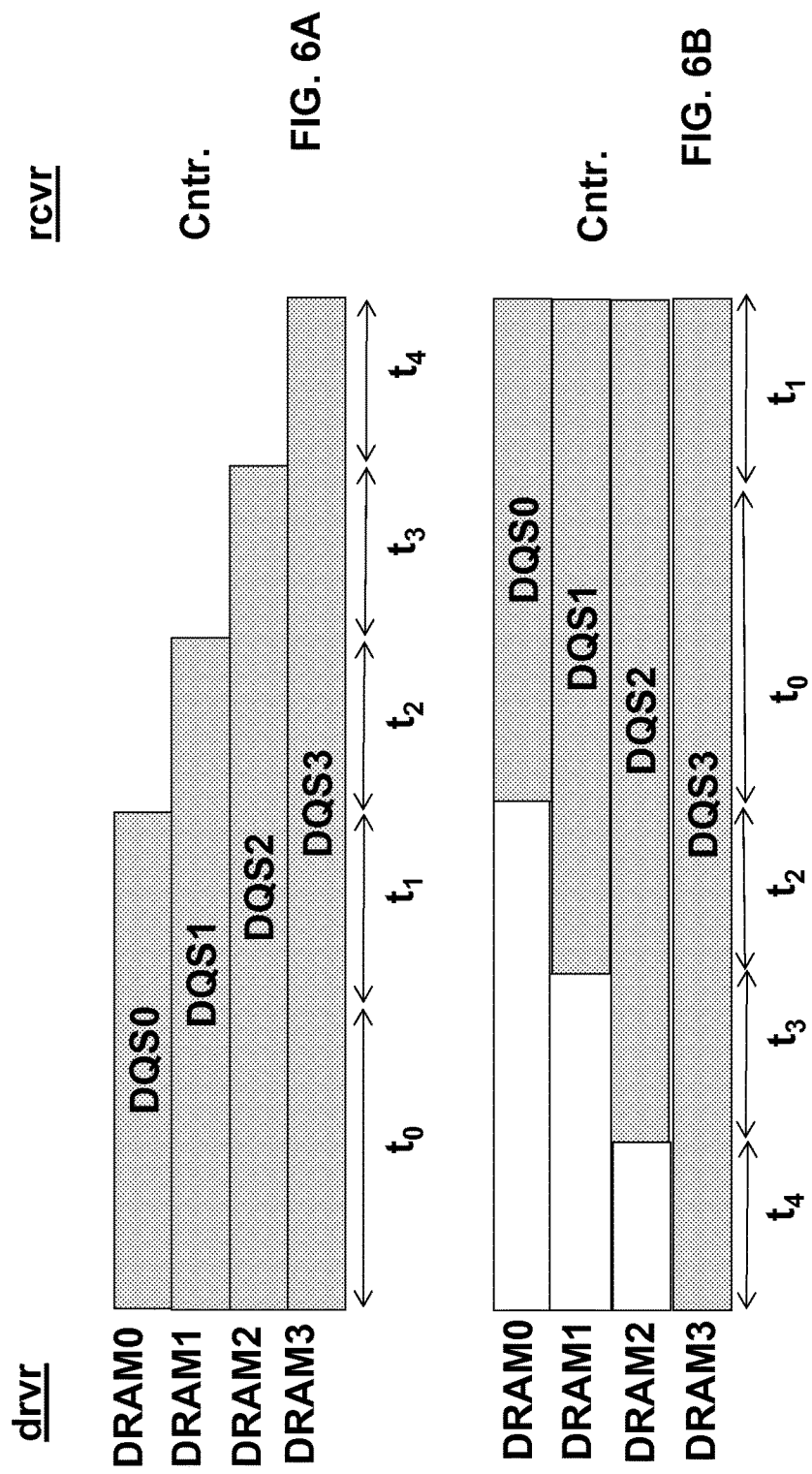
FIG. 6A is a schematic diagram graphically illustrating the juxtaposition of strobe signals passed between memory devices of a memory module and system controller during a read cycle in the interface of FIG. 4, the strobe signals without read leveling arriving at different times due to fly-by routing of their associated clock nets.
FIG. 6B is a schematic diagram graphically illustrating the juxtaposition of strobe signals passed between memory devices of a memory module and system controller during a read cycle in the interface as shown in FIG. 6A, but with read leveling applied.
Figure 7:
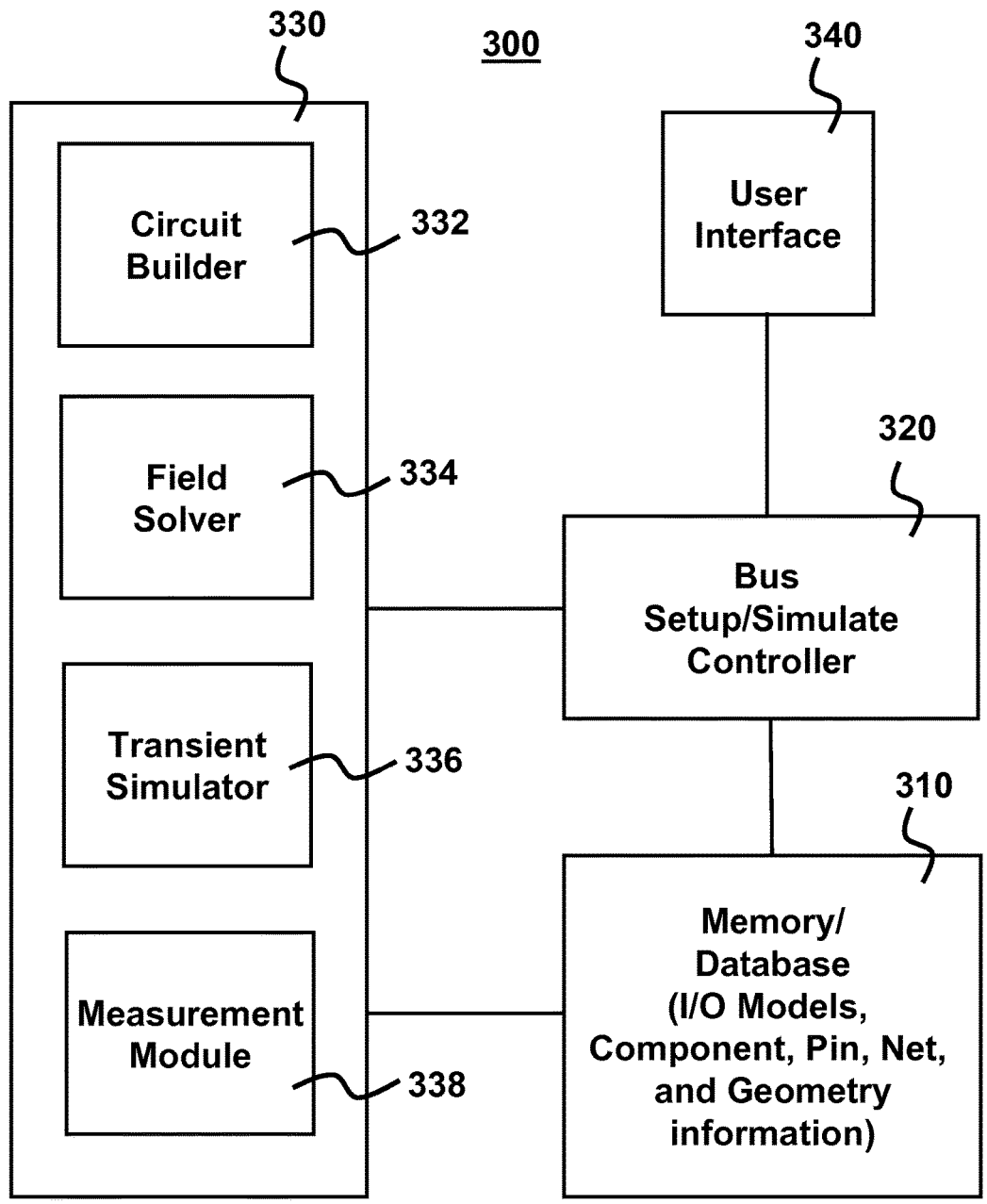
FIG. 7 is a block diagram illustrating an interconnection of units in a system formed in accordance with an exemplary embodiment of the present invention.

A physical implementation of the electronic system under analysis would carry out in suitable manner the required write and read leveling processes, much as illustrated in FIGS. 5-6. Automatic measures are provided in accordance with the present invention to enable modeling of such timing compensation even at the SI analysis stage of the design cycle for the given electronic system, so that errors due to timing skew may be avoided. A system 300 formed in accordance with an exemplary embodiment of the present invention, is generally illustrated in FIG. 7. While shown in isolation, system 300 is preferably incorporated into any suitable simulation based design and analysis tool known in the art to operate in integrated manner therewith, employing the tool's existing resources (such as for simulation) and expanding its automated capabilities. In the embodiment shown, system 300 is illustratively configured, for example, to augment and improve the bus flow analysis of a source synchronous bus within a simulation based SI analysis tool.

System 300 includes a memory unit 310 which stores various parametric data for the electronic system under design and analysis. Preferably, memory unit 310 provides a database of information necessary to characterize the electronic system and aid in its design/analysis. The database may include, for example, modeling information (such as a device model library) as well as circuit layout and routing information such as component data, pin data, net data, geometry data, and the like.

System 300 further includes an analysis controller 320 coupled to the memory unit 310 and a timing alignment unit 330 preferably coupled to both the analysis controller unit 320 and the memory unit 310. System 300 further includes in this embodiment a user interface unit 340 coupled to the analysis controller unit 320, which preferably establishes one or more graphic user interfaces for a user to selectively control system configuration and actuation.

System 300 may be actuated to operate in a behavioral model based simulation environment to preserve proper alignment of timing signals in a source synchronous interface between different portions of the electronic system under analysis. System 300 automatically adapts behavioral modeling of the electronic system to the extent that timing requirements of the source synchronous interface are accounted for much as they would be in an actual physical implementation of the electronic system.

The timing alignment unit 330 preferably includes a circuit builder module 332 and field solver module 334 which are suitably implemented in software to generate circuit models for the nets identified as carrying the timing signals in question between a certain driver and receiver (of the electronic system being designed and analyzed). The field solver module may include any suitable 2-D or 3-D field solver computer program(s) known in the art to extract circuit models for the passive structural elements defining each of the identified nets. The circuit builder module 332 actuates the field solver module 334 to thereby generate electrical models for passive structural elements making up a behavioral model of the identified nets.

The timing alignment unit 330 further includes a transient simulator module 336 which invokes a time domain simulation on the electrical models generated for the identified nets. In most applications, sufficient simulation capabilities will be available in the design and analysis tool into which system 300 is incorporated, or otherwise operably coupled. Alternatively, any suitable circuit simulation tool known in the art may be invoked by module 336.

Output waveforms generated by transient simulation runs actuated by module 336 are passed to a measurement module 338, which then determines the flight time skew effects due to geometric or other disparities in the nets carrying the given timing signals. Like the other modules of the timing alignment unit 330, the measurement module is preferably implemented in software to execute the necessary computations to obtain timing and/or noise measurements indicative of timing skew. Among other things, the respective time delay intervals, or timing offsets, required for appropriate read and write leveling may then be determined.

In the embodiment shown, the analysis controller unit 320 is preferably configured as a bus setup/simulate controller. As such, analysis controller unit 320 in this embodiment controls the setup and simulation options pertaining to each of the buses where read and/or write leveling are to be applied. The analysis controller unit 320 acquires bus setup and simulation options, preferably from the user via the user interface unit 340, and saves the acquired information in the database unit 310. The analysis controller unit 320 invokes the circuit builder module 332 to generate circuit files for the nets of the bus, whereupon the circuit builder module 332 invokes the field solver module 334 to extract electrical models for the passive structures making up those bus nets. The circuit builder module 332 combines the solved electrical models with other information relating to the electronic circuit design stored in the database unit 310, such as connectivity, I/O model, and setup information, to generate corresponding circuit files suited for simulation (such as SPICE or other such suitable type known in the art).

The analysis controller unit 320 thereafter invokes the transient simulator model to carry out transient simulation runs on the generated circuit files. The analysis controller unit 320 then actuates the measurement module 338 to compute the required timing and noise measurements (such as time skew, setup and hold times, noise margins, and the like) based on simulation-generated waveforms. These measurements and waveforms are preferably passed to the user interface unit 340 for display and use in further analyses.

Figure 8:
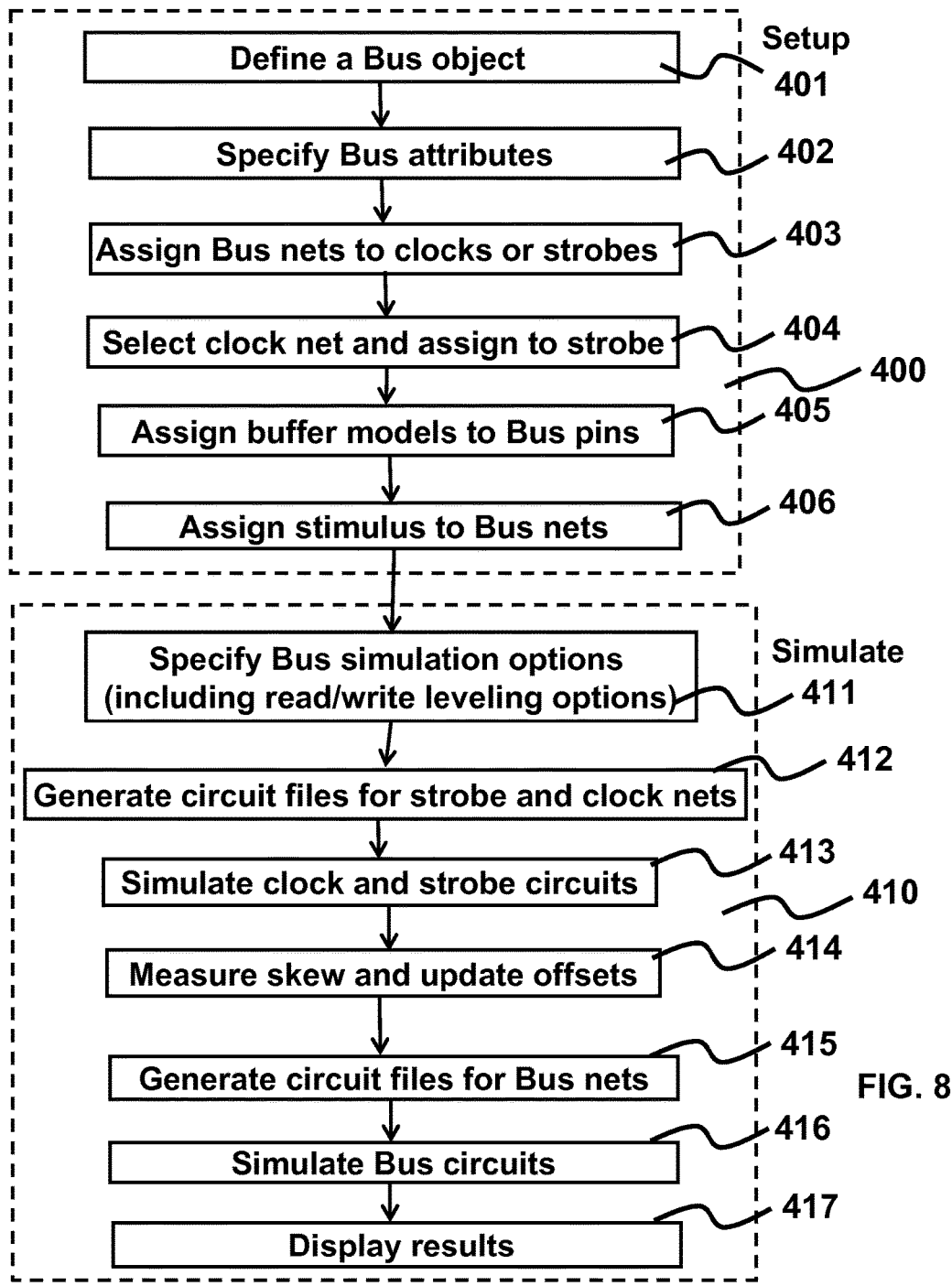
FIG. 8 is a flow diagram illustrating a flow of processes carried out by the embodiment of FIG. 7 for automatically determining flight time skew and modeling time alignment responsive thereto in an electrical integrity analysis of a source synchronous interface.

Referring to FIG. 8, there is shown a flow diagram illustrating a flow of processes carried out by system 300 to support SI analysis of a source synchronous bus in accordance with an exemplary embodiment of the present invention. In this embodiment, the operation of system 300 is integrated into the operation of a host design and analysis tool which carries out the SI analysis. The flow of processes reflects this integration and, therefore, shows those processes used not only for automatically determining the applicable flight time skew(s), but also to carry out the SI analysis which uses that flight time skew to model the requisite read/write leveling during simulation of source synchronous bus operation.

System 300 generally carries out a plurality of bus setup processes 400 which lead to a plurality of bus simulation control processes 410. The bus setup process 400 includes definition of a bus object at block 401. The bus object is preferably named in block 401, and the group of predefined nets belonging to the bus (stored for instance in a layout database in memory unit 310) are identified. The flow then proceeds to block 402, where certain bus attributes required for processing downstream are specified. Preferably, bus attributes such as direction, controller reference designation, choice of switching edge(s), and identification of derating table file are specified. Individual nets of the bus are then assigned at block 403 to respective clock or strobe nets connected to the bus/system controller (of the source synchronously interfaced portion of the electronic system design being analyzed).

Figure 13:
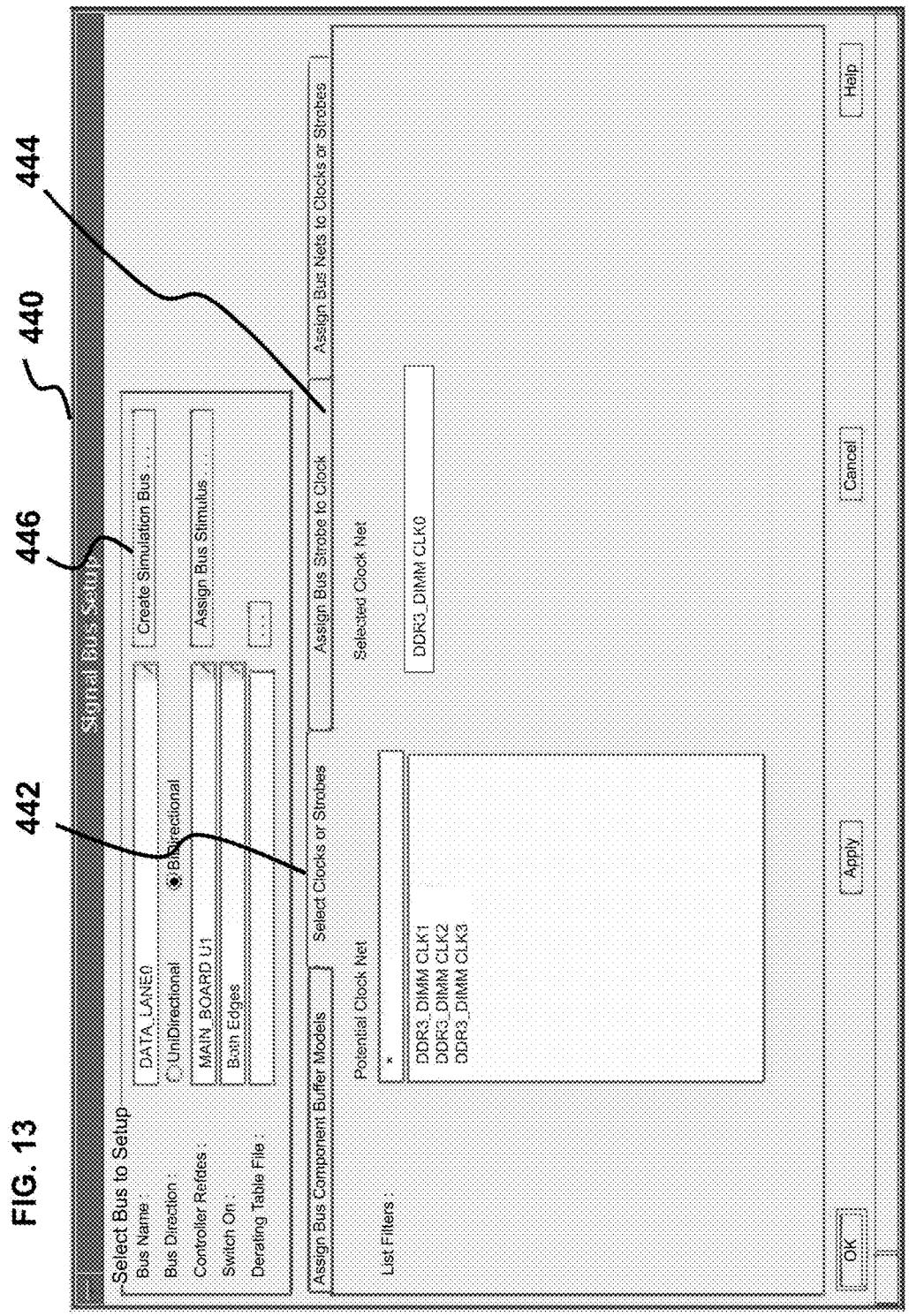
FIG. 13 is an illustrative representation of a graphic user interface generated during system operation in an exemplary embodiment of the present invention, showing the display of a bus setup dialog window example.
Figure 14:
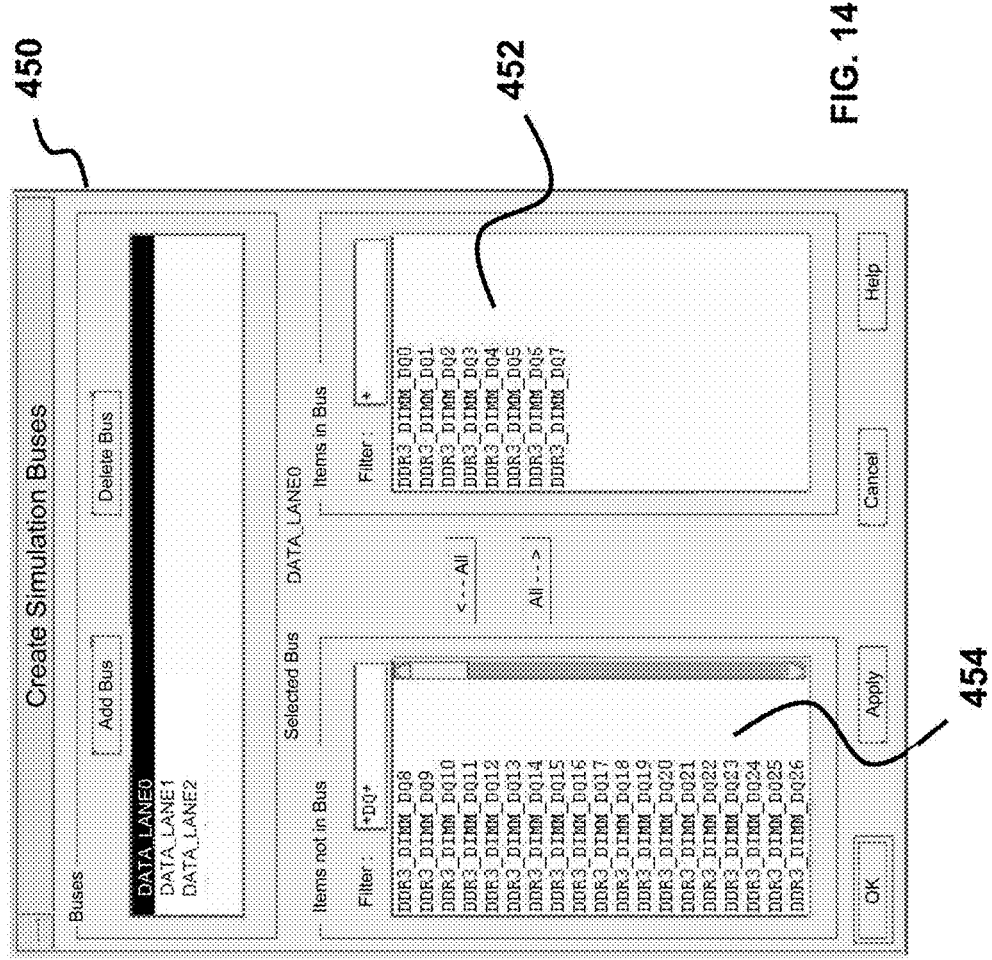
FIG. 14 is an illustrative representation of a graphic user interface generated during system operation in an exemplary embodiment of the present invention, showing the display of a bus configuration dialog window example.

The flow then proceeds to block 404 where a clock net is selected from the nets connected to the bus/system controller and associated with its corresponding strobe net on the bus (for instance via a Bus Setup dialog window of the graphic user interface illustrated in FIG. 13). The clock signal passed through the selected clock net then serves as the reference based on which the flight time skew is computed. The computed flight time skew, of course, may be used thereafter to offset the bus strobe signals and thereby model during the SI analysis of the selected bus the read/write leveling which would occur during actual operation of the bus.

At block 405, behavioral I/O buffer models—from a device model library stored in memory unit 310 or elsewhere—are then assigned to the pins of the bus nets and of their associated clock or strobe. The stimulus to be applied to the bus nets for simulated operation are assigned thereto at block 406 (for instance via one or more interfaces such as the Bus Stimulus Setup dialog window of the graphic user interface illustrated in FIG. 16). Parameters such as frequency, duty cycle, offsets, jitter, bit pattern, and the like are suitably specified as necessary for the bus data and clock nets. In accordance with certain aspects of the present invention, the time skew offsetting measurements for modeling read/write leveling may be automatically incorporated upon their determination as set forth herein.

Figure 15:
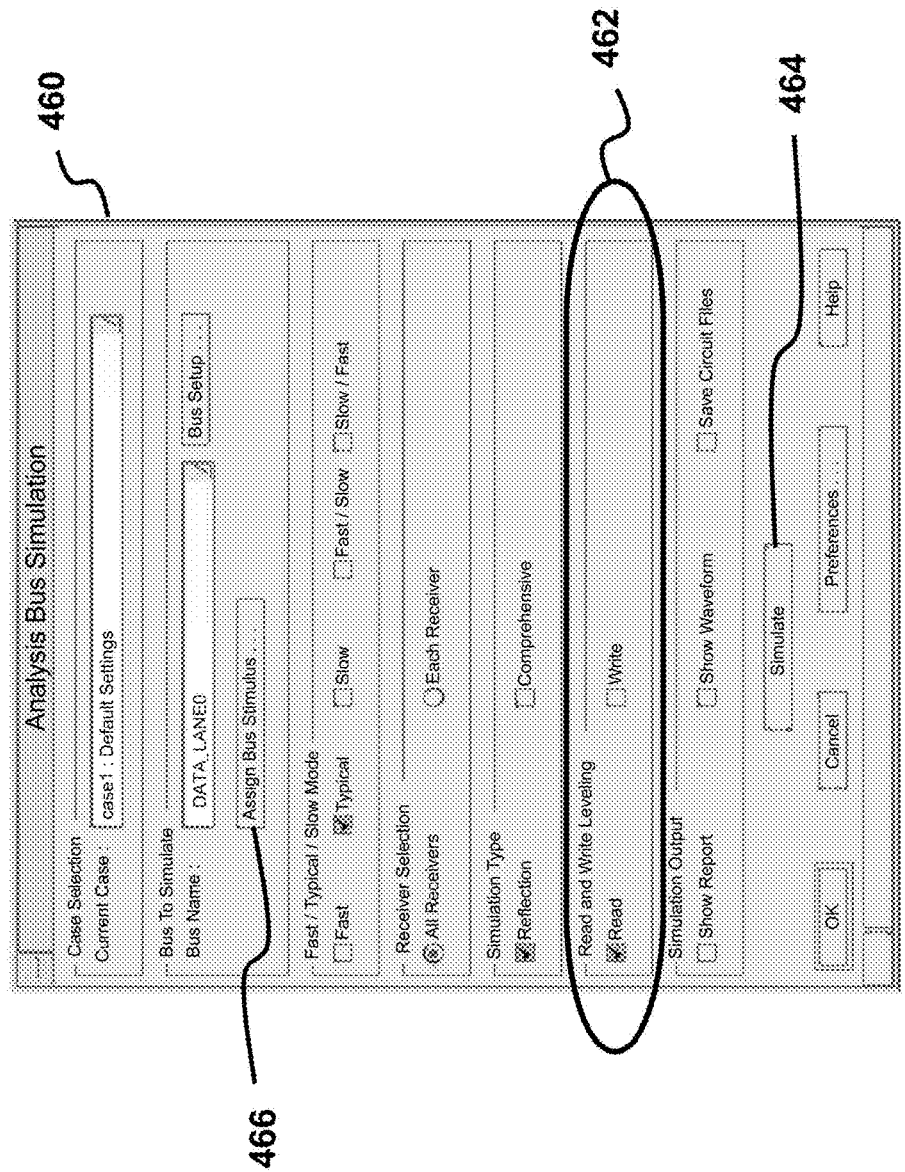
FIG. 15 is an illustrative representation of a graphic user interface generated during system operation in an exemplary embodiment of the present invention, showing the display of a simulation setup dialog window example.

The flow proceeds thereafter to the bus simulation control processes 410 (for instance via a Bus Simulation dialog window of the graphic user interface illustrated in FIG. 15), where at block 411 the certain bus simulation options as simulation type, fast/typical/slow modes, simulation output, and the like are specified as desired, along with options to select read or write leveling. If read or write leveling has been selected for simulation in support of SI analysis (for instance via an Analysis Bus Simulation dialog window of the graphic user interface illustrated in FIG. 15), the flow proceeds to block 412, where the circuit files for the given strobe net and its associated clock net are automatically generated based preferably on: bus setup, stimulus assignment, simulation options, stored buffer models, layout database, and solved models (as solved by field solver module 334) for the passive structures on the nets. Again, if read or write leveling has been selected for simulation in support of SI analysis, the flow proceeds next to block 413, where the associated clock and strobe net circuits are simulated via a suitable time domain simulator to simulate passage of the strobe and clock signals therethrough. From the results of this simulation, measurements are made at block 414 to determine the time skew observed between the strobe and clock signals when passed through their respective nets. The timing offsets (such as delay intervals) required to accurately model read/write leveling are then updated based on the measured skew.

At block 415, the original bus flow analysis resumes with the circuit files for the other bus nets being generated, based preferably on: bus setup, stimulus assignment, simulation options, stored buffer models, layout database, and solved models for the nets' passive structures. A time domain simulator is invoked at block 416 to simulate all the bus circuits to support SI analysis of the bus, and the waveforms and other information resulting from simulation displayed for the user at block 417.

Figure 9:
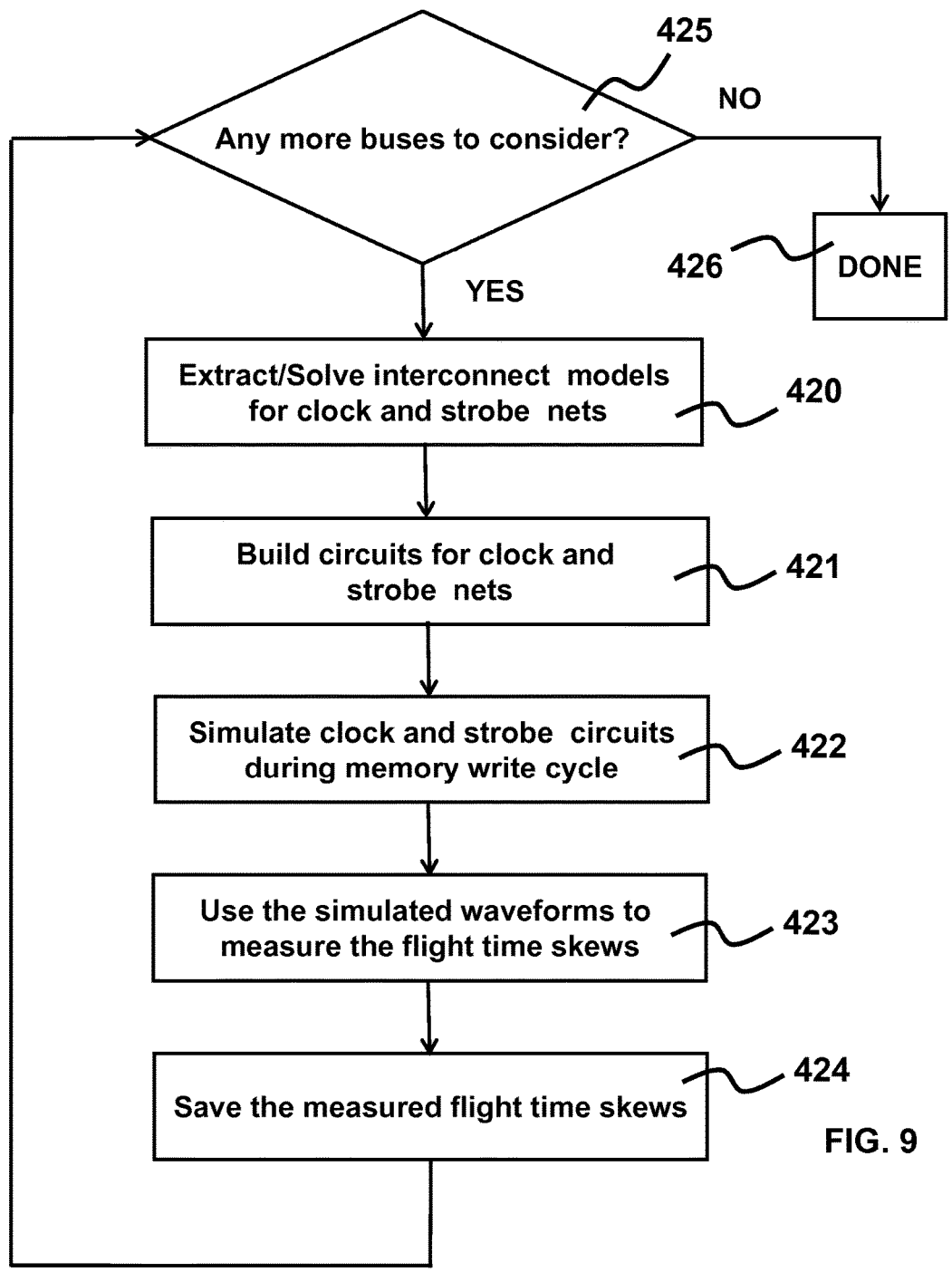
FIG. 9 is a flow diagram illustrating in isolation the flow of processes reflected in FIG. 8 for automatically determining flight time skew and modeling time alignment for use in an ensuing electrical integrity analysis of a source synchronous interface.

Referring to FIG. 9, there is shown a flow diagram illustrating more in isolation the flow of processes carried out by system 300 in accordance with an exemplary embodiment of the present invention to generate the timing offsets that are needed (for subsequent use in modeling read/write leveling in an ensuing SI analysis of a source synchronous bus). The processes may be applied iteratively for each source synchronous bus to be analyzed, upon those nets of the bus requiring read or write leveling. The process need not be applied to nets that are not subject to read/write leveling—like those nets dedicated to data lanes.

At block 420, pre-stored definitions for passive interconnect components making up each of the clock and strobe nets in the selected bus are extracted from the electronic circuit design database and passed to the field solver module 334 of system 300. The nets are defined from the given driver to the given receiver (actually from an I/O pin of the driver device to an I/O pin of the receiver device)—for instance, from a particular pin of a buffer/system controller to a particular pin of a DRAM device—through passive integrated components (like traces, transmission lines, vias), discrete components (like connectors), and/or active integrated components (accounting for cross-coupling, parasitic, and other such intrinsic effects). The field solver module 334 executes to generate corresponding electrical circuit models for the passive integrated components of the given nets which are not already available in a device model library stored in memory unit 310.

At block 421, the solved electrical circuit models are suitably stitched together with models for other contributing portions of the nets available in the device model library— for example, connector models and driving/receiving I/O buffer models retrieved from the device model library. Also at block 421, the appropriate stimulus is applied to generate a netlist or other suitable circuit file for each of the strobe and clock nets in question.

At block 422, the strobe and clock net circuits are then simulated using their circuit files, preferably during a memory write cycle. A transient circuit simulator of any suitable type known in the art may be employed toward that end. From the transient waveforms and/or other results of the simulation, flight time skews are measured at block 423, as described for example in following paragraphs. The measured flight time skews are preferably displayed for the user and saved at block 424 for use in setting the appropriate timing offsets to model the read/write leveling necessary for accurate SI analysis.

The flow proceeds next to block 425, where a check is made for any more buses remaining to be considered. If so, the processes of blocks 420-424 are repeated. Otherwise, the flow proceeds to block 426, where the time alignment process is closed, so that the intended SI analysis may proceed on the given bus(es).

Figure 10:
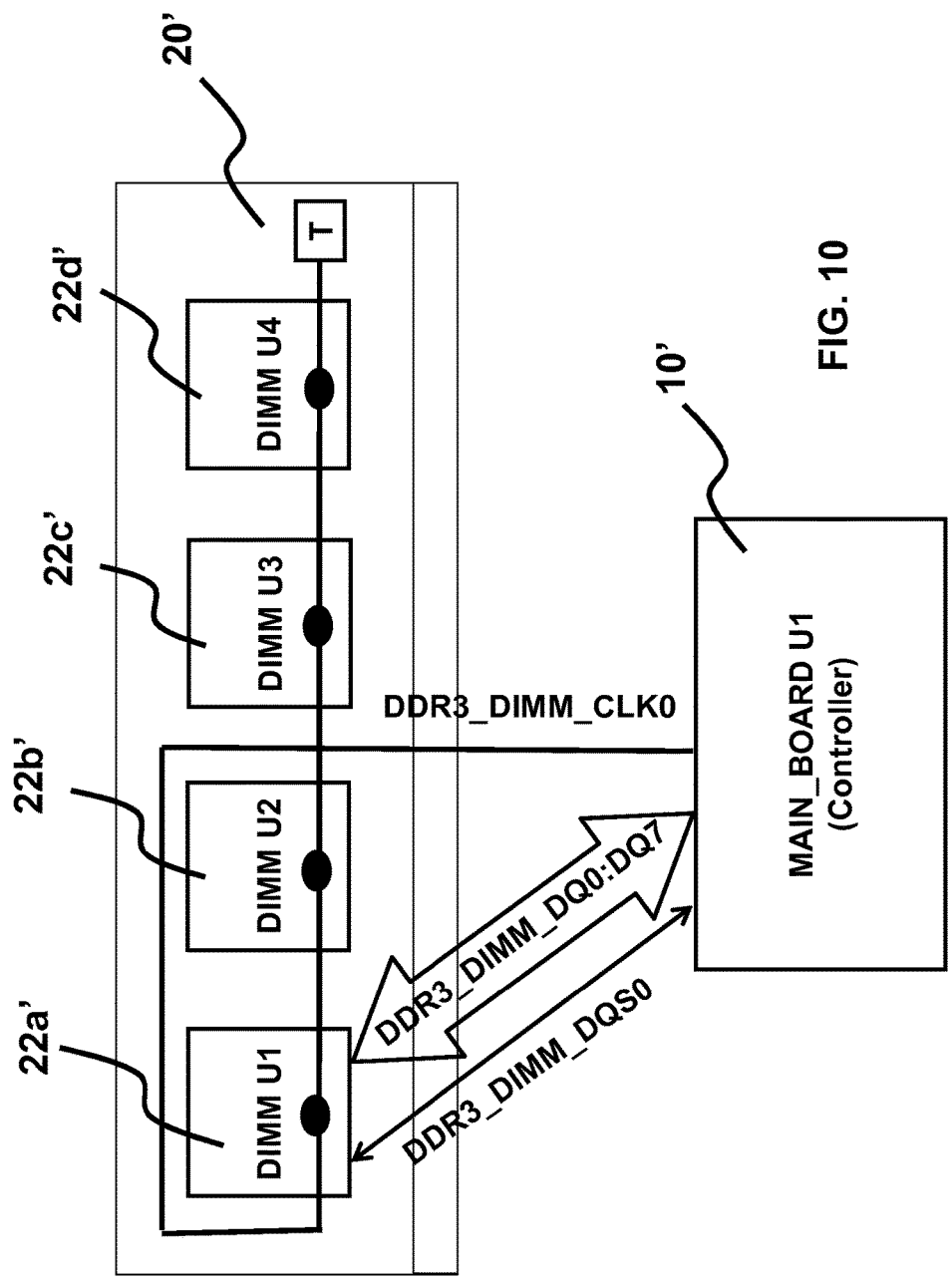
FIG. 10 is a schematic diagram illustrating the correlation of certain signals and nets in the memory interface architecture of FIG. 4.
Figure 11:
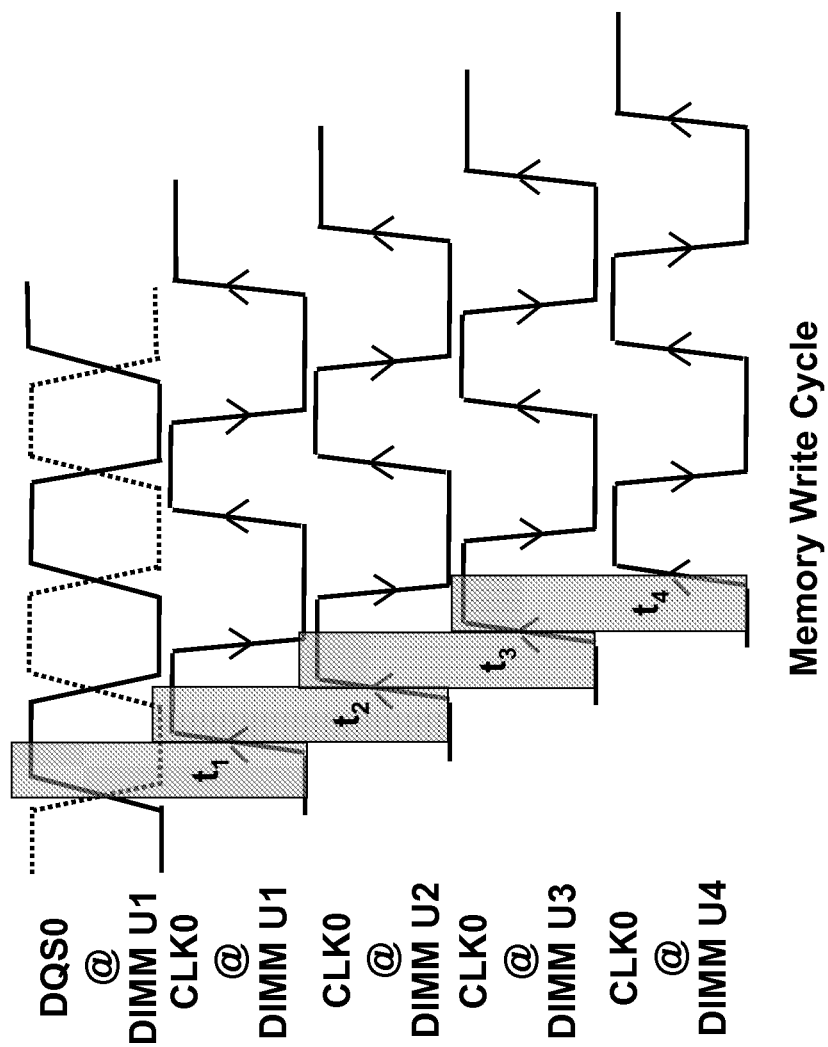
FIG. 11 is a schematic diagram graphically illustrating the relative juxtapositions of a certain strobe signal at one memory device and the clock signals at each of the respective memory devices in a memory module during a write cycle in the interface of FIG. 4, which reveal components of flight time skew.
Figure 12:
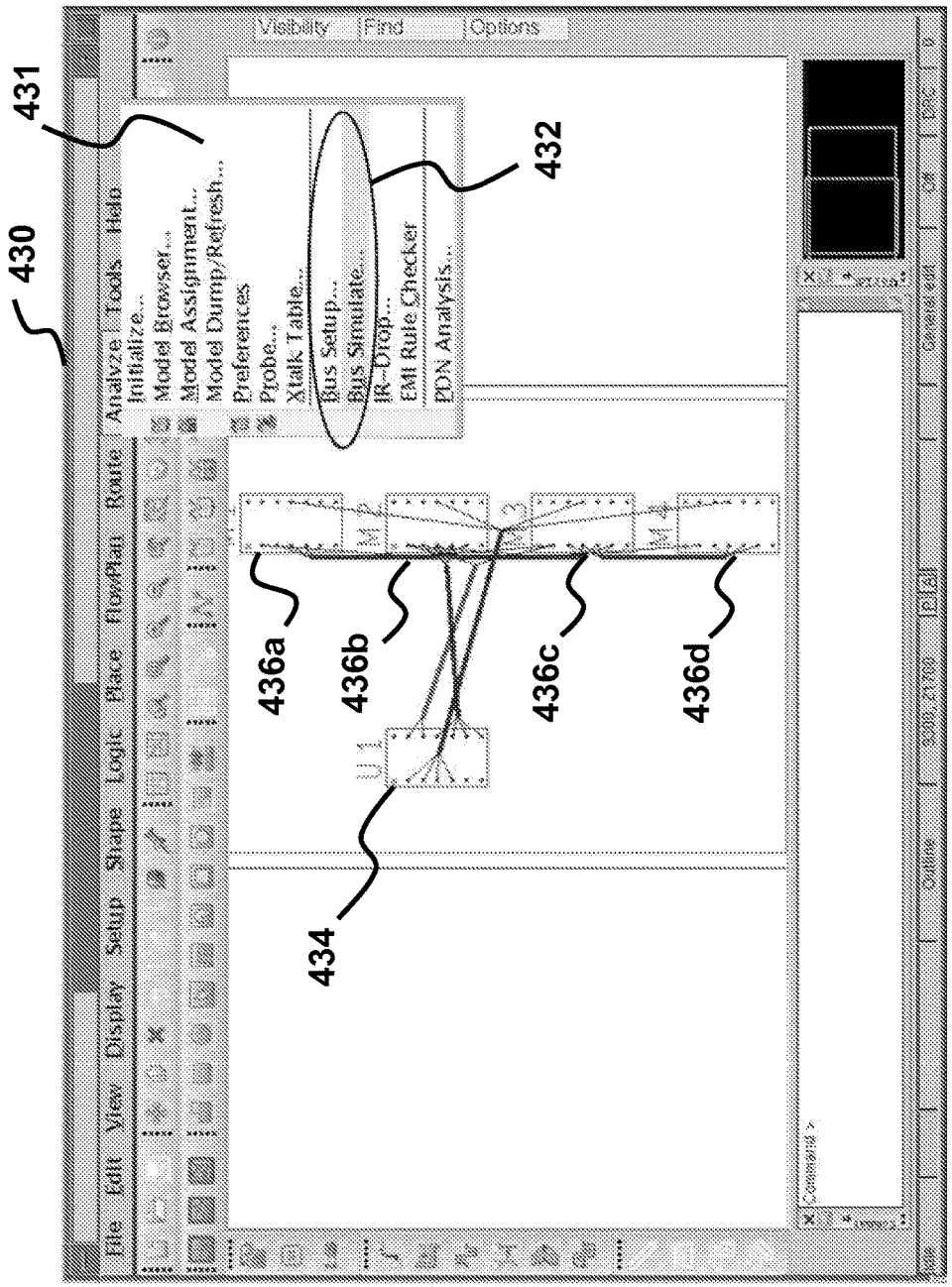
FIG. 12 is an illustrative representation of a graphic user interface generated during system operation in an exemplary embodiment of the present invention, showing the display of a design layout window example.

FIGS. 10-11 schematically illustrate by way of example measurement of flight time skew transient waveforms obtained by simulation of certain clock and strobe net circuit models between devices (controller 10' and DRAM devices 22a'-22d' of a DIMM 20') in DDR3 memory interface architecture shown in FIG. 4. For purposes of illustration, the signals are defined in FIGS. 10-11 as follows: strobe signal DDR3_DIMM_DQS0 is assigned to data DDR3_DIMM_DQ0:DQ7 carried via bus lane DATA-_LANE0; and, the strobe signal DDR3_DIMM_DQS0 (or "DQS0") is associated with clock signal DDR3_DIMM_CLK0 (or "CLK0"). Graphically illustrated in FIG. 11 are sample timing signal waveforms as they may result from simulation during a memory write cycle: for the strobe signal at the first DRAM device 22a' (DIMM U1), and for the clock signal at each of the DRAM devices 22a'-22d' (DIMM U1-DIMM U4) on the DIMM 20'.

The resulting flight time skews may be measured from comparative analysis of these timing signal waveforms. As graphically illustrated for this case, for example, the time difference t1 between the first crossing point of the differential strobe signal DQS0 at device DIMM U1 and the middle point of the first rising edge of the clock signal CLK0 at device DIMM U1 represents the flight time skew between the mutually associated strobe and clock signals for that device DIMM U1. This is the additional time required for the clock signal CLK0 to reach device DIMM U1 compared to its associated strobe signal DQS0, due to the fly-by routing topology of its clock net. Similarly, the time difference t2 between the middle point of the first rising edge of the clock signal CLK0 at device DIMM U1 and the middle point of the first rising edge of the clock signal CLK0 at the next device DIMM U2 represents the additional flight time skew affecting the mutually associated strobe and clock signals for that device DIMM U2.

This measurement of the additional incremental flight time skews due to the fly-by routing topology may continue for the next DRAM devices along the fly-by route of the clock net. The time difference t3 between the middle point of the first rising edge of the clock signal CLK0 at device DIMM U2 and the middle point of the first rising edge of the clock signal CLK0 at the next device DIMM U3 represents the additional flight time skew (over the total flight time skew at the preceding device DIMM U2) affecting the mutually associated strobe and clock signals for that device DIMM U3. Likewise, the time difference t4 between the middle point of the first rising edge of the clock signal CLK0 at device DIMM U3 and the middle point of the first rising edge of the clock signal CLK0 at the next device DIMM U4 represents the further flight time skew component (over the total flight time skew at the preceding device DIMM U3) affecting the mutually associated strobe and clock signals for that device DIMM U4.

Equipped with these incremental time differences t1-t4, the write leveling undergone by the corresponding timing signals in a physical implementation may be modeled in connection with bus DATA_LANE0 by shifting its strobe signal DQS0 in time by an offset t1 from the controller side (that is, with the controller 10' referenced as the driver). Conversely, the read leveling undergone by the corresponding timing signals in a physical implementation may be modeled in connection with bus DATA_LANE0 by shifting its strobe signal DQS0 in time by a total offset of (t2+t3+t4) from the DIMM side (that is, with DIMM 20' referenced as the driver). Preferably, these offsets for modeling write and read leveling are automatically added to the controller and alternate (memory side) offsets when the stimulus is defined prior to execution of the desired source synchronous bus analysis.

The ensuing analysis of the bus is rendered more accurate and far less cumbersome as a result. This not only makes the analysis process much more user-friendly, it contributes considerably to shortening and simplifying the overall design cycle of DDR3 memory and other such source synchronous interfaces prone to time alignment concerns.

FIGS. 12-16 illustrate but a few examples of various graphic display windows that may be generated by the user interface unit 340 (FIG. 7) during the course of system operation in accordance with certain exemplary embodiments of the present invention. As described in preceding paragraphs, the automatic time alignment features of system operation may be incorporated within pre-existing simulation based design and analysis tools. This is evident in the display window example 430 of FIG. 12, where a circuit layout representation of a DDR3 memory interface (with bus/system controller 434 interconnected to devices 436a-436d of a DIMM) is displayed for a user. The toolbar includes an "Analyze" pull down menu 431 which includes a numerous selectable operations, including "Bus Setup" and "Bus Simulate" operations 432. By selecting these operations, timing alignment may be effected as described in preceding paragraphs, in support of Bus flow analysis. Preferably, system 300 is sufficiently integrated into the given design and analysis tool for shared use of the software and hardware resources of the host tool to the extent possible.

When the "Bus Setup" option is selected, an interface such as the "Signal Bus Setup" dialog window example 440 shown in FIG. 13 may be launched and displayed for the user. The "Select Clocks or Strobes" and "Assign Bus Strobe to Clock" tabs 442, 444 are provided by which the user may select and associate each strobe net in question with its corresponding clock net. This determines the reference clock signal against which the flight time skew will eventually be computed for modeling the applicable read and/or write leveling during SI analysis of the selected bus.

Other parts of the window 440 provide for various other user specifications and selections for the selected bus to be analyzed, including:
  definition of a bus object containing the nets of the selected bus;
  specification of the given controller's reference designator;
  specification of the strobe/clock edge(s) at which the data/address signals are to be latched at the receiving side;
  specification of the bus direction (for example, unidirectional or bidirectional);
  association of a data bus (for example, a bidirectional bus) with one strobe signal, or association of an address/command/control bus (for example, a unidirectional bus) with one or more clock signal; and,
  various other parameters not necessarily related to timing alignment.

Detailed specification of the bus is preferably made by selecting the "Create Simulation Bus" button of the window 440. This preferably opens a corresponding dialog window 450 shown for example in FIG. 14. As shown in this window 450, the bus selected in the illustrated example is identified by the name "DATA_LANE0," and populated with eight constituent nets (DDR3_DIMM_DQ0: DDR3_DIMM_DQ7) selectively identified from the other available nets 454.

When the "Bus Simulate" option is selected from the window 430, an interface such as the "Analysis Bus Simulation" dialog window example 460 shown in FIG. 15 may be launched. By this window, a user may configure the available simulation resources to carry out the desired time domain simulation. In accordance with certain aspects of the present invention, the simulation may be configured to execute not only in support of the desired SI analysis, but also in support of the read and/or write leveling to be modeled when applicable. Where such read and/or write leveling is to be modeled, the timing skew/offsets are first measured based on supporting transient simulation in that regard. The measured skew/offsets are then applied during subsequent simulation in support of the SI analysis itself, in order to actually model the read and/or write leveling during such subsequent simulation.

Accordingly, Read and Write buttons 462 are provided to selectively enable or disable each of the Read and Write Leveling modeling options in configuring simulation. Where Read and/or Write Leveling is enabled, the simulation resources are configured to automatically carry out the timing alignment processes of system 300 described in preceding paragraphs in support of the bus flow analysis to be conducted. Transient simulation is preliminarily executed on the circuit models obtained for the timing signal nets in question, in order to determine the timing offsets required for Read and Write Leveling. Window 460 in this example provides the following options for the user:
  Enable Read Leveling Only (by for example checking the Read button and un-checking the Write button);
  Enable Write Leveling Only (by for example checking the Write button and un-checking the Read button);
  Enable both options (by for example checking both the Read and Write buttons); or,
  Disable both options (by for example un-checking the Read and Write buttons).

Preferably, the window 460 may be used to configure and launch execution of both the preliminary simulation to determine the read/write leveling offset measures required to address flight time skew, as well as the simulation to conduct the desired SI analysis (in this case, a source synchronous bus flow analysis). When either or both of the "Read" and "Write" buttons 462 are selected, execution of the preliminary simulation may be launched by selecting the "Simulate" button 464. Preferably, the same "Simulate" button 464 may be selected to alternatively launch execution of simulation for the actual SI analysis.

Once the preliminary simulation runs are executed and the required timing offsets measured, the measured offsets are automatically inserted by operation of system 300 into the stimulus established for the SI analysis simulation to follow. Thus, when a user views the stimulus to be assigned for the analysis simulation, by for example selecting the "Assign Bus Stimulus" button 466 provided in window 460, the stimulus parameters are automatically set by system 300 to reflect the offsets to account for the applicable read and/or write leveling.

Figure 16:
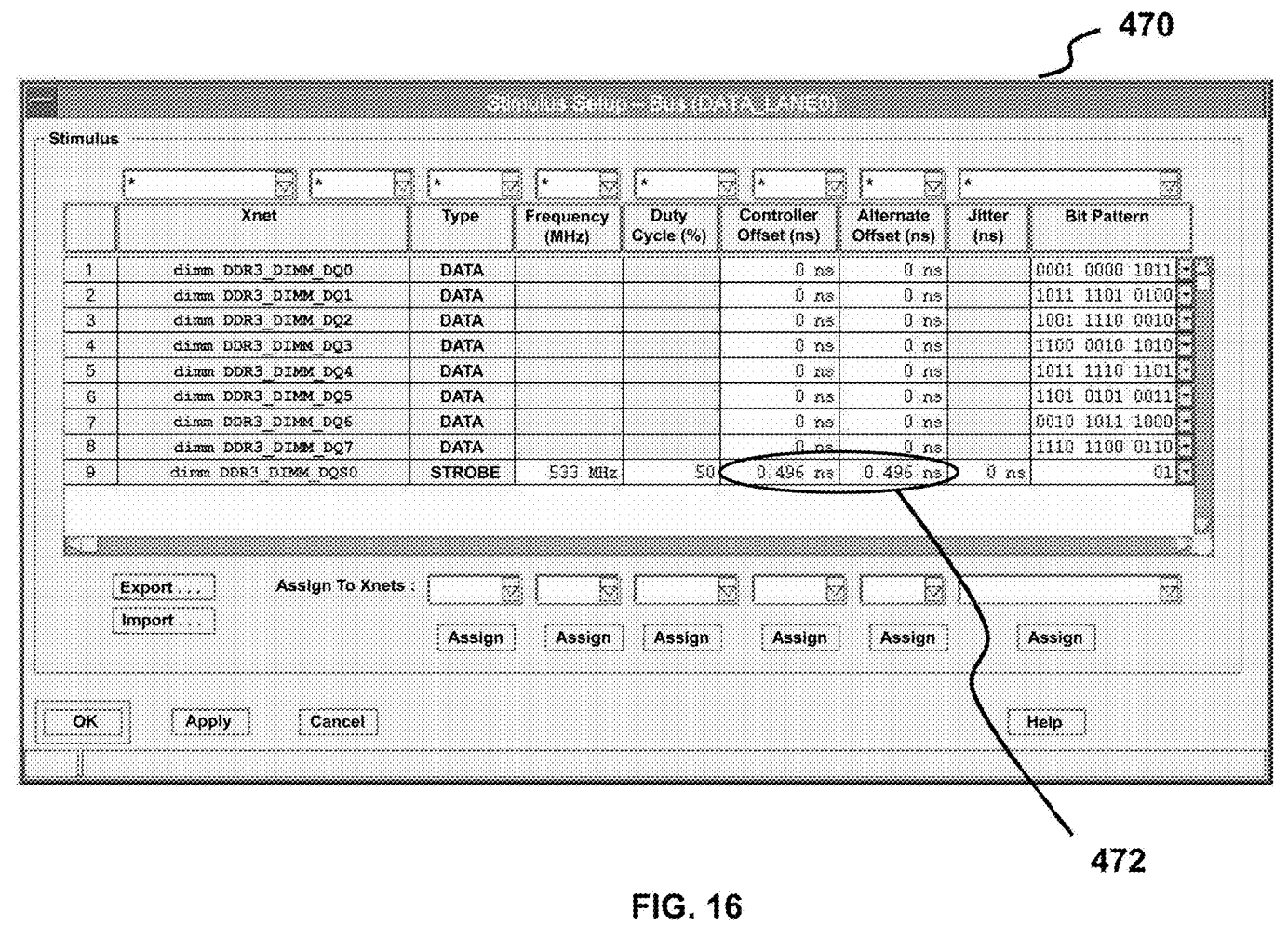

This is illustrated in FIG. 16, illustrating the "Stimulus Setup" dialog window 470 (for the selected bus) that may be opened, for example, when the "Assign Bus Simulation" button 466 is selected in window 460 to configure the SI analysis simulation. In this example, "Stimulus Setup" window 470 pertains to the selected bus "DATA_LANE0." Unlike the data nets for "dimm DDR3_DIMM_DQ0" through "dimm DDR3_DIMM_DQ7," the strobe net "dimm DDR3_DIMM_DQS0" is automatically pre-set with the measured timing offset—0.496 ns in this particular example. The read/write leveling that would take place in an actual physical implementation of the bus (of the electronic system) in question is accordingly accounted for in the ensuing SI analysis simulation.

Figure 17:
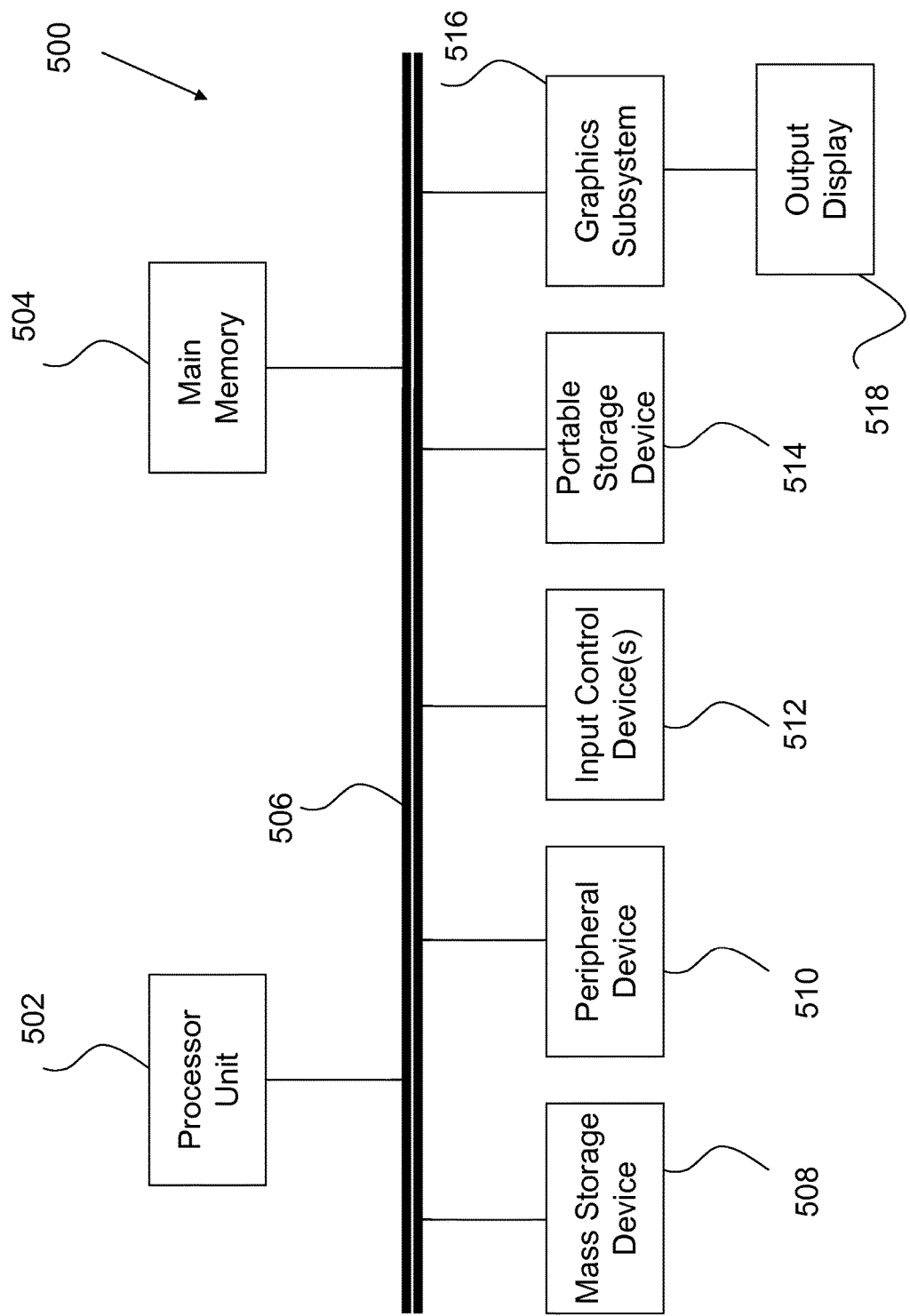
FIG. 17 is a block diagram illustrating an exemplary interconnection of units in a processor-based system for implementing the embodiments of systems and methods according to various aspects of the present invention.

FIG. 17 illustrates a block diagram of a computer system which may be employed to implement various embodiments in accordance with the present invention. A computer system 500 contains a processor unit 502, a main memory 504, an interconnect bus 506, a mass storage device 508, peripheral device(s) 510, input control device(s) 512, portable storage drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor 502. Main memory 504 preferably includes banks of dynamic random access memory (DRAM) as well as high-speed cache memory.

For the purpose of simplicity, the components of computer system 500 are connected via interconnect bus 506. However, computer system 500 may be connected through one or more data transport means. For example, processor unit 502 and main memory 504 may be connected via a local microprocessor bus and mass storage device 508, peripheral device(s) 510, portable storage medium drive(s) 514, and graphic subsystem 516 may be connected via one or more input/output (I/O) buses. Mass storage device 508, which may be implemented with a magnetic disk drive, an optical disk drive, a solid state device, or an attachment to network storage, is non-volatile storage device for storing data, databases, and instructions, to be used by processor unit 502. In a software embodiment, mass storage device 508 may store the software to load it into main memory 504. Mass storage device 508 may include any form of non-transitory computer readable media and may include multiple forms of different media.

Portable storage medium drive 514 operates in conjunction with a portable non-volatile storage medium such as a floppy disk, a compact disk read only memory (CD-ROM), a digital versatile disk read only memory (DVD-ROM), or a memory card such as e.g. Secure Digital High Capacity (SDHC), to input and output data and code to and from the computer system 500. In one embodiment, the software is stored on such a portable medium, and is input to computer system 500 via portable storage medium drive 514. Peripheral device(s) 510 may include any type of computer supported device such as an input/output (I/O) interface, to add additional functionality to computer system 500. For example, peripheral device(s) 510 may include a network interface card to interface computer system 500 to a network.

Input control device(s) 512 provide a portion of the user interface for a computer system 500 user. Input control device(s) 512 may include an alphanumeric keypad for inputting alphanumeric and other key information; and a cursor control device such as a mouse, a track pad or stylus; or cursor direction keys.

In order to display textual and graphical information, computer system 500 contains graphic subsystem 514 and output display(s) 518. Output display 518 may include a cathode ray tube (CRT) display, liquid crystal display (LCD), plasma, digital light processing (DLP) or active matrix organic light emitting diode (AMOLED) display. Graphic subsystem 516 receives textual and graphical information and processes the information for output to display 518.

In a software implementation, a method formed in accordance with an exemplary embodiment of the present invention includes a plurality of computer executable instructions, to be implemented on a computer system. Prior to loading in the computer system, the software may reside as encoded information on a computer-readable tangible or non-transitory medium such as a magnetic floppy disk, a magnetic tape, CD-ROM, DVD-ROM, flash memory, or any other suitable computer readable medium.

In a hardware implementation, such a system in accordance with an exemplary embodiment of the present invention may be realized in any suitable computer based platform known in the art. For example, the system may comprise suitable storage media and one or more dedicated processors or shared processors executing/controlling other functions, wherein the employed processor(s) is programmably configured with processor instructions for performing the functions described herein. Suitable circuits may also be developed to execute certain aspects of these functions.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A system for maintaining alignment of timing signals of a source synchronous interface between driver and receiver portions of an electronic system in a behavioral model-based simulation environment, the system comprising:

a memory unit storing parametric data relating to the electronic system, said parametric data including first and second timing signals to be transmitted respectively through predefined first and second nets between the driver and receiver portions, said first and second nets defining geometric paths of differing lengths between the driver and receiver portions, said first and second timing signals corresponding to predetermined information and mutually assigned to one another; and, a timing alignment unit coupled to said memory unit, said timing alignment unit being executable to:

selectively generate first and second net behavioral models respectively modeling a time skewing due to said differing geometric paths of said first and second nets on said first and second timing signals passed therethrough, said net behavioral models being selectively generated based on interconnect models extracted therefor;

actuate preliminary transient simulation locally on said first and second net behavioral models to simulate time skewed transmission of said first and second timing signals through said first and second nets; and, measure responsive to said preliminary transient simulation a timing skew between respective transmissions of said first and second timing signals through said first and second nets, the measured timing skew being applied to a subsequent general simulation of the source synchronous interface for compensation between said first and second timing signals, said general simulation being based on behavioral models for execution at a higher level of abstraction than a hardware model-based simulation.

2. The system as recited in claim 1, further comprising an analysis controller unit coupled to said memory unit and said timing alignment unit, said analysis controller unit mutually assigning said first and second nets one to the other.

3. The system as recited in claim 2, further comprising a user interface unit coupled to said analysis controller unit for entry of user selectable settings and displaying said timing skew measured by said timing alignment unit.

4. The system as recited in claim 2, wherein said timing alignment unit includes:
a field solver;
a circuit builder actuating said field solver to generate electrical models for passive structural portions included in said first and second net behavioral models, said circuit builder module generating circuit files corresponding to said first and second net behavioral models; and,
a measurement module coupled to receive output waveforms of said transient simulation to generate a plurality of timing and noise measurements based thereon indicative of said timing skew.

5. The system as recited in claim 2, wherein the driving portion includes simulated representation of a system controller device and the receiver portion includes simulated representation of a memory module having a plurality of DRAM devices; and, said first net defines a fly-by routing topology about said DRAM devices.

6. The system as recited in claim 2, wherein said parametric data includes a plurality of said second timing signals, wherein said first timing signal includes a clock signal associated with an address signal for directing a plurality of data signals to be transmitted between said system controller device and DRAM devices; and, each of said second timing signals includes a strobe signal associated with one of said data signals.

7. The system as recited in claim 6, wherein said analysis controller unit actuates compensation for said timing skew in said general simulation of the source synchronous interface, said compensation including write leveling, where said strobe signals are selectively delayed in launch from said system controller device by said timing skew corresponding thereto for arrival at respective ones said DRAM devices substantially aligned in timing with said clock signal.

8. The system as recited in claim 6, wherein said analysis controller unit actuates compensation for said timing skew in said general simulation of the source synchronous interface, said compensation including read leveling, where said strobe signals are selectively delayed in launch from said DRAM devices based on relative timing skews corresponding thereto for arrival at said system controller device substantially aligned in timing one with another.

9. The system as recited in claim 6, wherein said timing skew is applied to a bus flow analysis executed in said general simulation of the source synchronous interface; and, said user interface unit generates a graphic user interface for at least one of the following:
entering bus attributes for said bus flow analysis;
selecting said mutual assignment of said first and second nets;
configuring said timing skew compensation to be executed in said general simulation of the source synchronous interface; and,
displaying said timing skew for at least one of said strobe signals.

10. The system as recited in claim 6, wherein said DRAM devices are configured according to a dual data rate 3 (DDR3) architecture.

11. A system for maintaining time alignment of clock and strobe signals in a simulated source synchronous interface between driver and receiver portions of a behaviorally modeled electronic system, the system comprising:
a memory unit storing parametric data relating to the electronic system, said parametric data including a clock signal and a plurality of strobe signals to be transmitted respectively through predefined clock and strobe nets between the driver and receiver portions, said clock and strobe nets defining geometric paths of differing lengths between the driver and receiver portions, said clock signal being associated with an address signal for directing a plurality of data signals to be transmitted between the driver and receiver portions, each of said strobe signals being associated with one of said data signals; and,
a timing alignment unit coupled to said memory unit, said timing alignment unit being executable to:
selectively generate clock net and strobe net behavioral models respectively modeling a time skewing due to said differing geometric paths of said clock and strobe nets on said clock and strobe signals respectively passed therethrough, said net behavioral models being selectively generated based on interconnect models extracted therefor and mutually assigned to one another;
actuate preliminary transient simulation locally on said clock net and strobe net behavioral models to simulate time skewed transmission of said clock and strobe signals respectively through said clock and strobe nets; and,
measure responsive to said preliminary transient simulation a timing skew between respective transmissions of said clock and strobe signals through said clock and strobe nets, the measured timing skew being applied to a subsequent general simulation of the source synchronous interface for compensation between said clock and strobe timing signals, said general simulation being based on behavioral models for execution at a higher level of abstraction than a hardware model-based simulation.

12. The system as recited in claim 11, further comprising:
an analysis controller unit coupled to said memory unit and said timing alignment unit, said analysis controller unit mutually assigning said clock and strobe nets one to the other; and,
a user interface unit coupled to said analysis controller unit for entry of user selectable settings and displaying said timing skew measured by said timing alignment unit.

13. The system as recited in claim 12, wherein said timing alignment unit includes:
   a field solver;
   a circuit builder actuating said field solver to generate electrical models for passive structural portions included in said clock net and strobe net behavioral models, said circuit builder module generating circuit files corresponding to said clock net and strobe net behavioral models; and,
   a measurement module coupled to receive output waveforms of said transient simulation to generate a plurality of timing and noise measurements based thereon indicative of said timing skew.

14. The system as recited in claim 13, wherein the driving portion includes simulated representation of a system controller device and the receiver portion includes simulated representation of a memory module having a plurality of dual data rate 3 (DDR3) DRAM devices; and, said clock net defines a fly-by routing topology about said DDR3 DRAM devices.

15. The system as recited in claim 14, wherein said analysis controller unit actuates compensation for said timing skew in said general simulation of the source synchronous interface, said compensation including write leveling, where said strobe signals are selectively delayed in launch from said system controller device by said timing skew corresponding thereto for arrival at respective ones said DDR3 DRAM devices substantially aligned in timing with said clock signal.

16. The system as recited in claim 15, wherein said analysis controller unit actuates compensation for said timing skew in said general simulation of the source synchronous interface, said compensation including read leveling, where said strobe signals are selectively delayed in launch from said DDR3 DRAM devices based on relative timing skews corresponding thereto for arrival at said system controller device substantially aligned in timing one with another.

17. The system as recited in claim 16, wherein said timing skew is applied to a bus flow analysis executed in said general simulation of the source synchronous interface; and, said user interface unit generates a graphic user interface for at least one of the following:
   entering bus attributes for said bus flow analysis;
   selecting said mutual assignment of said clock and strobe nets;
   configuring said timing skew compensation to be executed in said general simulation of the source synchronous interface; and,
   displaying said timing skew for at least one of said strobe signals.

18. A method for maintaining alignment of timing signals of a source synchronous interface between driver and receiver portions of an electronic system in a behavioral model-based simulation environment, the method comprising:
   establishing first and second timing signals corresponding to predetermined information to be transmitted respectively through predefined first and second nets between the driver and receiver portions, said first and second nets defining geometric paths of differing lengths between the driver and receiver portions;
   selectively generating first and second net behavioral models respectively modeling a time skewing due to said differing geometric paths of said first and second nets on said first and second timing signals passed therethrough, said first and second net behavioral models being selectively generated based on interconnect models extracted therefor and mutually assigned to one another;
   executing preliminary transient simulation locally on said first and second net behavioral models in a processor to simulate time skewed transmission of said first and second timing signals through said first and second nets; and,
   measuring responsive to said preliminary transient simulation a timing skew between respective transmissions of said first and second timing signals through said first and second nets, the measured timing skew being applied to a subsequent general simulation of the source synchronous interface for compensation between said first and second timing signals, said general simulation being based on behavioral models for execution at a higher level of abstraction than a hardware model-based simulation.

19. The method as recited in claim 18, wherein the driving portion includes simulated representation of a system controller device and the receiver portion includes simulated representation of a memory module having a plurality of DRAM devices; and, said first net defines a fly-by routing topology about said DRAM devices.

20. The method as recited in claim 19, comprising a plurality of said second timing signals, wherein said first timing signal includes a clock signal associated with an address signal for directing a plurality of data signals to be transmitted between said system controller device and DRAM devices; and, each of said second timing signals includes a strobe signal associated with one of said data signals.

21. The method as recited in claim 20, wherein said compensation for said timing skew includes write leveling, where said strobe signals are selectively delayed in launch from said system controller device by said timing skew corresponding thereto for arrival at respective ones said DRAM devices substantially aligned in timing with said clock signal.

22. The method as recited in claim 20, wherein said compensation for said timing skew includes read leveling, where said strobe signals are selectively delayed in launch from said DRAM devices based on relative timing skews corresponding thereto for arrival at said system controller device substantially aligned in timing one with another.

23. The method as recited in claim 20, wherein said DRAM devices are configured according to a dual data rate 3 (DDR3) architecture.

24. The method as recited in claim 20, further comprising applying said timing skew for each said strobe signal to said general simulation of the source synchronous interface for substantial alignment in timing with said clock signal during execution thereof.

25. The method as recited in claim 20, wherein said timing skew is applied to a bus flow analysis executed in said general simulation of the source synchronous interface; and, a graphic user interface is generated for at least one of the following:
   entering bus attributes for said bus flow analysis;
   selecting said mutual assignment of said first and second nets;
   configuring said timing skew compensation to be executed in said general simulation of the source synchronous interface; and, displaying said timing skew for at least one of said strobe signals.

\* \* \* \* \*